(12) United States Patent
Hoshiba et al.

(10) Patent No.: US 12,533,641 B2
(45) Date of Patent: Jan. 27, 2026

(54) ULTRASONIC TREATMENT APPARATUS AND FINE BUBBLE SUPPLY METHOD

(71) Applicants: NIPPON STEEL CORPORATION, Tokyo (JP); NIPPON STEEL ENGINEERING CO., LTD., Tokyo (JP)

(72) Inventors: Eri Hoshiba, Tokyo (JP); Hiromitsu Date, Tokyo (JP)

(73) Assignees: NIPPON STEEL CORPORATION, Tokyo (JP); NIPPON STEEL ENGINEERING CO., LTD., Tokyo (JP)

(*) Notice: Subject to any disclaimer, the term of this patent is extended or adjusted under 35 U.S.C. 154(b) by 403 days.

(21) Appl. No.: 18/017,279

(22) PCT Filed: Jul. 29, 2020

(86) PCT No.: PCT/JP2020/029109
§ 371 (c)(1),
(2) Date: Jan. 20, 2023

(87) PCT Pub. No.: WO2022/024271
PCT Pub. Date: Feb. 3, 2022

(65) Prior Publication Data
US 2023/0264154 A1    Aug. 24, 2023

(51) Int. Cl.
*B01F 23/2373* (2022.01)
*B01F 23/232* (2022.01)
(Continued)

(52) U.S. Cl.
CPC ...... *B01F 23/2373* (2022.01); *B01F 23/2323* (2022.01); *B01F 23/803* (2022.01);
(Continued)

(58) Field of Classification Search
CPC .............. B01F 23/2373; B01F 23/2323; B01F 23/803; B01F 2215/0427
See application file for complete search history.

(56) References Cited

U.S. PATENT DOCUMENTS

| 2006/0283328 | A1* | 12/2006 | Saiki | ........................ B08B 3/12 96/289 |
| 2010/0224214 | A1 | 9/2010 | Kaneko et al. | |

(Continued)

FOREIGN PATENT DOCUMENTS

| JP | 7-278860 A | 10/1995 |
| JP | 7-328316 A | 12/1995 |

(Continued)

*Primary Examiner* — Natasha N Campbell
(74) *Attorney, Agent, or Firm* — Birch, Stewart, Kolasch & Birch, LLP

(57) ABSTRACT

To realize excellent durability of an apparatus, realize a dissolved gas amount suitable for propagation of ultrasonic waves, and stably generate fine bubbles that further comply with a treatment using ultrasonic waves. An ultrasonic treatment apparatus according to the present invention includes: a treatment part capable of accommodating a treatment liquid and an object to be treated; an ultrasonic generator that is provided in the treatment part and applies ultrasonic waves to the object to be treated; and a circulation path for circulating the treatment liquid in the treatment part, in which a fine bubble generator which performs deaeration on an extracted treatment liquid and generates fine bubbles in the treatment liquid, is provided to the circulation path, in series with a treatment liquid extraction pipe. The fine bubble generator has two or more narrow portions each having an opening flow path with a size narrower than an inside diameter of the treatment liquid extraction pipe, in which the opening flow paths of the narrow portions adjacent to each other are configured to prevent the treatment liquid from proceeding straight, and an opening cross- (Continued)

sectional area at each pressure reduction zone satisfies a predetermined relation.

15 Claims, 22 Drawing Sheets

(51) Int. Cl.
*B01F 23/80* (2022.01)
*B01F 25/431* (2022.01)
*B01F 101/24* (2022.01)
*B08B 3/12* (2006.01)

(52) U.S. Cl.
CPC ........ *B01F 25/431971* (2022.01); *B08B 3/12* (2013.01); *B01F 2101/24* (2022.01); *B01F 2215/0427* (2013.01)

(56) References Cited

U.S. PATENT DOCUMENTS

| 2016/0236158 A1 | 8/2016 | Bauer |
| 2020/0047220 A1 | 2/2020 | Hoshiba et al. |

FOREIGN PATENT DOCUMENTS

| JP | 2005-95877 A | 4/2005 |
| JP | 2008-126128 A | 6/2008 |
| JP | 2008-296217 A | 12/2008 |
| JP | 2011-115745 A | 6/2011 |
| JP | 2016-536139 A | 11/2016 |
| JP | 2020-14989 A | 1/2020 |
| KR | 10-2018-0019284 A | 2/2018 |
| WO | WO 2010/101036 A1 | 9/2010 |
| WO | WO 2018/169050 A1 | 9/2018 |

* cited by examiner

FIG. 8

| | 1 | 2 | 3 | 4 | 5 (VENTURI TUBE) |
|---|---|---|---|---|---|
| ARRANGEMENT PATTERN | | | | | |
| CROSS-SECTIONAL AREA RATIO (FIRST/SECOND) | 0.5 / 0.5 | 0.5 / 0.4 | 0.4 / 0.5 | 0.5 / 0.5 | 0.5 |
| FB PARTICLE DIAMETER [mm] | 0.010 | 0.050 | 0.005 | 0.200 | 5.000 |

ULTRASONIC TREATMENT APPARATUS AND FINE BUBBLE SUPPLY METHOD

TECHNICAL FIELD

The present invention relates to an ultrasonic treatment apparatus, and a fine bubble supply method.

BACKGROUND ART

Generally, in a manufacturing process of various types of metal objects such as steel plates and steel pipes, a cleaning treatment method is widely used to remove dirt, scales, and the like on a surface of the metal object by immersing it in a cleaning tank that contains chemical solutions, rinses, and so on. Examples of cleaning treatment apparatuses performing such cleaning treatment methods include, for example, a treatment apparatus using high-pressure airflow injection nozzles and an ultrasonic treatment apparatus using ultrasonic waves.

In the ultrasonic treatment apparatus using ultrasonic waves as above, in order to strengthen a cavitation action in the ultrasonic cleaning, a measure is taken such that deaeration is performed for improving ultrasonic propagation property, and micro bubbles to be a core of cavitation are introduced. For example, as a method of performing the deaeration, a deaeration method using a vacuum pump, a deaeration method using a hollow fiber membrane, a deaeration method using throttling, and the like are proposed. Further, for example, as methods of introducing micro bubbles, a bubble micronizing method through high-speed spiral flow, a method in which gas is dissolved in a supersaturated state under high pressure, and micro bubbles are generated during release, and so on are proposed. However, each of the deaeration methods and the micro bubble generating methods as described above requires a dedicated unit, and an apparatus that performs these methods in combination is large in size and very expensive.

Accordingly, in recent years, studies are being conducted regarding an apparatus in which stable generation of micro bubbles and regulation of dissolved gas amount (namely, deaeration) are integrally performed.

For example, the following Patent Document 1 proposes an apparatus in which bubbles are generated by an obstacle provided in a flow path for introducing a cleaning liquid into a propeller-type circulating pump, the bubbles are micronized by the propeller of the circulating pump, and deaeration of the cleaning liquid is performed by a deaeration device connected to the flow path.

Further, the following Patent Document 2 proposes a method in which liquid is introduced into a suction pipe line of a liquid feed pump, and a part of the suction pipe line is throttled, to thereby reduce a pressure between the throttle and the liquid feed pump and let dissolved gas in the liquid free as bubbles.

Further, the following Patent Document 3 proposes an apparatus in which, with respect to a circulation path for circulating a treatment liquid, two pumps are provided so that their liquid feeding directions become opposite to each other, to thereby perform deaeration of the treatment liquid and generation of micro bubbles.

Further, as a technique for generating micro bubbles, each of the following Patent Document 4 and Patent Document 5 proposes a method in which baffle plates and the like are provided with an interval therebetween in a flow path of liquid, and cavitation caused when the liquid collides with the baffle plates and the like, is utilized.

PRIOR ART DOCUMENT

Patent Document

Patent Document 1: Japanese Laid-open Patent Publication No. 2008-296217
Patent Document 2: Japanese Laid-open Patent Publication No. H7-328316
Patent Document 3: Japanese Laid-open Patent Publication No. 2020-14989
Patent Document 4: Japanese Laid-open Patent Publication No. 2005-95877
Patent Document 5: Japanese Translation of PCT International Application Publication No. JP-T-2016-536139

DISCLOSURE OF THE INVENTION

Problems to be Solved by the Invention

However, in the technique disclosed in the above Patent Document 1 and Patent Document 2, although micro bubbles can be generated, fine bubbles having a bubble diameter that sufficiently complies with a cleaning treatment using ultrasonic waves, are not generated in a stable manner. Further, in the technique disclosed in the above Patent Document 1, the micro bubbles are generated by shearing the bubbles using the propeller of the circulating pump, and thus the propeller may be damaged by erosion-corrosion, and durability of the apparatus is not sufficient. Besides, in the technique disclosed in the above Patent Document 2, there is provided a gas-liquid separation tank for making the generated bubbles to be floated and separated, in which coarse bubbles are intentionally generated for the purpose of eliminating the bubbles, and thus there is no ability of generating fine bubbles.

Further, even if the techniques disclosed in the above Patent Document 3 to Patent Document 5 are used, there is still room for improvement in view of the stable generation of fine bubbles having a bubble diameter that sufficiently complies with a cleaning treatment using ultrasonic waves.

In particular, the above Patent Document 4 describes the technique in which pressure reduction is performed from a pressurized state, to thereby micronize bubbles generated by cavitation. As a result of studies conducted by the present inventors, it has been clarified that gas dissolved in liquid cannot be turned into bubbles unless a pressure after the pressure reduction can be set to 1 atmosphere or less. For this reason, in the above Patent Document 4, it becomes difficult to realize both the deaeration and the generation of fine bubbles.

The present invention was made in view of the above problems, and an object thereof is to provide an ultrasonic treatment apparatus excellent in durability of the apparatus, capable of realizing a dissolved gas amount suitable for propagation of ultrasonic waves, and stably generating fine bubbles that further comply with a treatment using ultrasonic waves, and a fine bubble supply method.

Means for Solving the Problems

As a result of earnest studies conducted by the present inventors to solve the above problems, it is possible to obtain findings that, by properly providing a plurality of stages of narrow portions satisfying predetermined conditions to a pipe that introduces a treatment liquid into a circulating pump, it is possible to stably generate fine bubbles that further comply with a treatment using ultrasonic waves, and no influence is exerted also on durability of a mechanism, which led to completion of the present invention.

The gist of the present invention completed based on the above findings is as follows.

[1] An ultrasonic treatment apparatus includes: a treatment part capable of accommodating a treatment liquid and an object to be treated; an ultrasonic generator that is provided in the treatment part and applies ultrasonic waves to the object to be treated; and a circulation path for circulating the treatment liquid in the treatment part, in which the circulation path has a circulating pump for circulating the treatment liquid, a treatment liquid extraction pipe that connects the treatment liquid extracted from the treatment part to the circulating pump, and a treatment liquid discharge pipe that discharges the treatment liquid passed through the circulating pump to the treatment part, and a fine bubble generator which performs deaeration on the extracted treatment liquid and generates fine bubbles in the treatment liquid, is provided to the circulation path, in series with the treatment liquid extraction pipe, in which the fine bubble generator has two or more narrow portions each having an opening flow path of the treatment liquid with a size narrower than an inside diameter of the treatment liquid extraction pipe, in which the opening flow paths of the narrow portions adjacent to each other are configured to prevent the treatment liquid from proceeding straight, in which regarding each of the narrow portions, when an opening cross-sectional area of the inside diameter of the treatment liquid extraction pipe is set to $A_0$, and an opening cross-sectional area of the inside diameter of the treatment liquid extraction pipe at an i (i is an integer of 1 or more)-th narrow portion from the treatment part side toward the circulating pump side is represented as $A_i$, an opening cross-sectional area ratio $R_i$ of the i-th narrow portion represented as $A_i/A_0$ satisfies the following formula (1), and when an interval between the i-th narrow portion and an i+1-th narrow portion is represented as $L_i$, the following formula (2) is satisfied.

[2] In the ultrasonic treatment apparatus described in [1], when the treatment liquid extraction pipe is seen from a pipe axis direction, positions of the opening flow paths of the narrow portions adjacent to each other are not overlapped with each other.

[3] In the ultrasonic treatment apparatus described in [1] or [2], a treatment tank which contains the treatment liquid is provided as the treatment part, and the ultrasonic generator indirectly applies ultrasonic waves to the object to be treated via the treatment liquid.

[4] In the ultrasonic treatment apparatus described in [1] or [2], the ultrasonic generator directly applies ultrasonic waves to the object to be treated that is immersed in the treatment liquid in the treatment part.

[5] In the ultrasonic treatment apparatus described in any one of [1] to [4], when the number of the narrow portions is set to N, and an N-th opening area ratio from the treatment part side toward the circulating pump side is represented as $R_N$, the following formula (3) and formula (4) are satisfied.

[6] In the ultrasonic treatment apparatus described in any one of [1] to [5], the number N of the narrow portions is 2 to 10.

[7] The ultrasonic treatment apparatus described in any one of [1] to [6] has one or a plurality of the narrow portions each formed by a projecting member projecting from an inner surface of the treatment liquid extraction pipe.

[8] The ultrasonic treatment apparatus described in [7] has, as the narrow portion, a movable projecting member projecting from the inner surface of the treatment liquid extraction pipe.

[9] The ultrasonic treatment apparatus described in any one of [1] to [8] has one or a plurality of the narrow portions each formed by an opening member provided with one or a plurality of through holes.

[10] In the ultrasonic treatment apparatus described in any one of [1] to [9], the ultrasonic generator can select a frequency of the ultrasonic waves from a frequency band of 20 kHz to 200 kHz.

[11] In the ultrasonic treatment apparatus described in any one of [1] to [10], the ultrasonic generator can apply ultrasonic waves to the treatment liquid while performing a sweep within a range of ±0.1 kHz to ±10 kHz centered on a selected frequency of the ultrasonic waves.

[12] A fine bubble supply method of supplying, when performing a predetermined treatment on an object to be treated while applying ultrasonic waves to a treatment part capable of accommodating a treatment liquid and the object to be treated, the treatment liquid containing fine bubbles to the treatment part, in which an ultrasonic generator that is provided in the treatment part and applies ultrasonic waves to the object to be treated, and a circulation path for circulating the treatment liquid in the treatment part are provided with respect to the treatment part, in which the circulation path has a circulating pump for circulating the treatment liquid, a treatment liquid extraction pipe that connects the treatment liquid extracted from the treatment part to the circulating pump, and a treatment liquid discharge pipe that discharges the treatment liquid passed through the circulating pump to the treatment part, and a fine bubble generator which performs deaeration on the extracted treatment liquid and generates fine bubbles in the treatment liquid, is provided to the circulation path, in series with the treatment liquid extraction pipe, in which the fine bubble generator has two or more narrow portions each having an opening flow path of the treatment liquid with a size narrower than an inside diameter of the treatment liquid extraction pipe, in which the opening flow paths of the narrow portions adjacent to each other are configured to prevent the treatment liquid from proceeding straight, in which regarding each of the narrow portions, when an opening cross-sectional area of the inside diameter of the treatment liquid extraction pipe is set to $A_0$, and an opening cross-sectional area of the inside diameter of the treatment liquid extraction pipe at an i (i is an integer of 1 or more)-th narrow portion from the treatment part side toward the circulating pump side is represented as $A_i$, an opening cross-sectional area ratio $R_i$ of the i-th narrow portion represented as $A_i/A_0$ satisfies the following formula (1), and when an interval between the i-th narrow portion and an i+1-th narrow portion is represented as $L_i$, the following formula (2) is satisfied.

[13] In the fine bubble supply method described in [12], the fine bubble generator generates the fine bubbles to make a dissolved gas amount to be 50% or less of a saturated dissolved gas amount in the treatment liquid to be discharged to the treatment part.

[14] In the fine bubble supply method described in [12] or [13], the fine bubble generator generates the fine bubbles to make the fine bubbles having an average bubble diameter of 1 μm to 100 μm exist at a bubble number density in a range of $1 \times 10^3$ pieces/mL to $1 \times 10^{10}$ pieces/mL in the treatment liquid to be discharged to the treatment part.

[15] In the fine bubble supply method described in any one of [12] to [14], the ultrasonic generator selects a frequency of the ultrasonic waves from a frequency band of 20 kHz to 200 kHz.

[16] In the fine bubble supply method described in any one of [12] to [15], the ultrasonic generator applies ultrasonic waves to the treatment liquid while performing a sweep within a range of 0.1 kHz to +10 kHz centered on a selected frequency of the ultrasonic waves.

$R_i = 0.10$ to $0.50$ — Formula (1)

$1.0 \le L_i/2(A_0/\pi)^{0.5} \le 5.0$ — Formula (2)

$R_{i+1} \ge R_i$ — Formula (3)

$R_N/R_1 \ge 1.10$ — Formula (4)

Effect of the Invention

As described above, according to the present invention, it is possible to provide an ultrasonic treatment apparatus capable of realizing a dissolved gas amount suitable for propagation of ultrasonic waves, stably generating fine bubbles that further comply with a treatment using ultrasonic waves, and being excellent in durability of the apparatus, and a fine bubble supply method.

BRIEF DESCRIPTION OF THE DRAWINGS

FIG. 8 is an explanatory diagram for explaining a fine bubble generator provided to the ultrasonic treatment apparatus according to the embodiment.

EMBODIMENTS FOR CARRYING OUT THE INVENTION

Hereinafter, preferred embodiments of the present invention will be described in detail with reference to the attached drawings. In the Description and the drawings, components having substantially the same functional configurations are denoted by the same codes, to thereby omit overlapped explanation.

(Overall Configuration of Ultrasonic Treatment Apparatus)

Figure 1A:
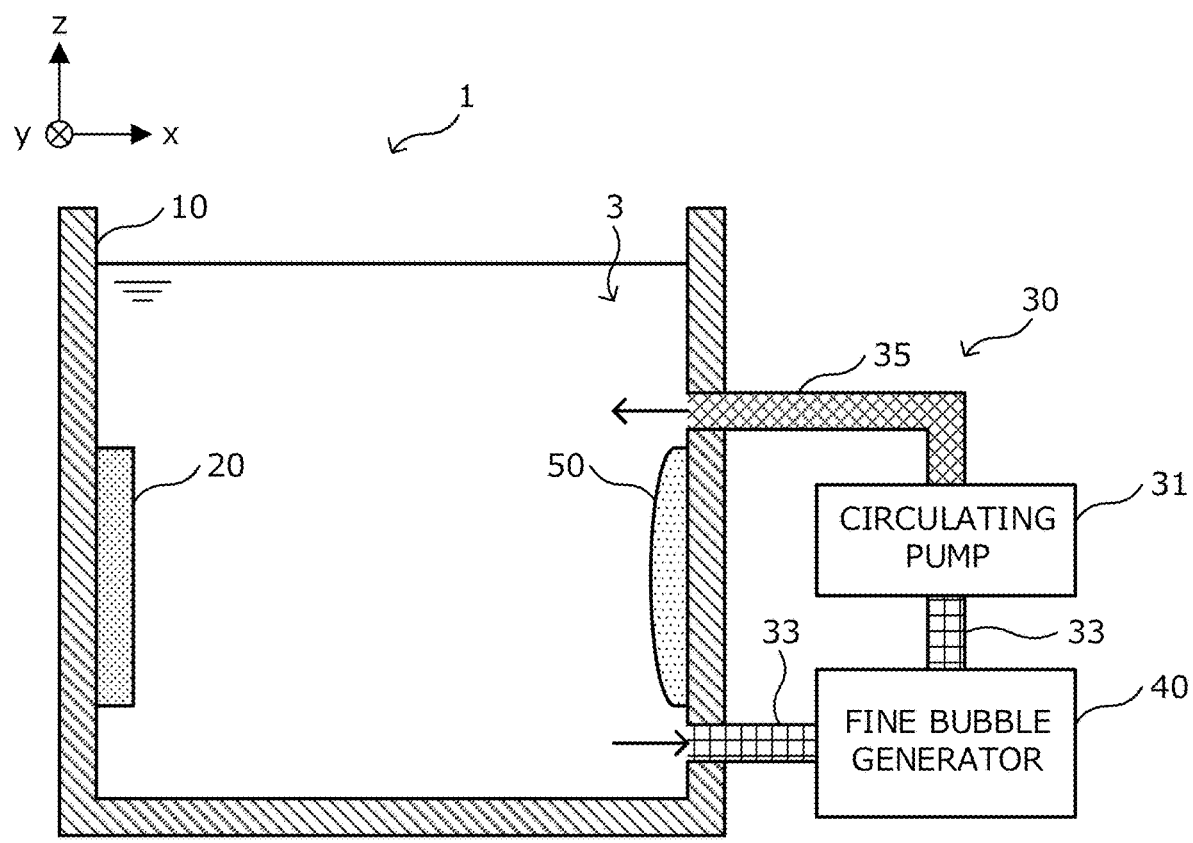
FIG. 1A is an explanatory diagram schematically illustrating an example of a configuration of an ultrasonic treatment apparatus according to an embodiment of the present invention.
Figure 1B:
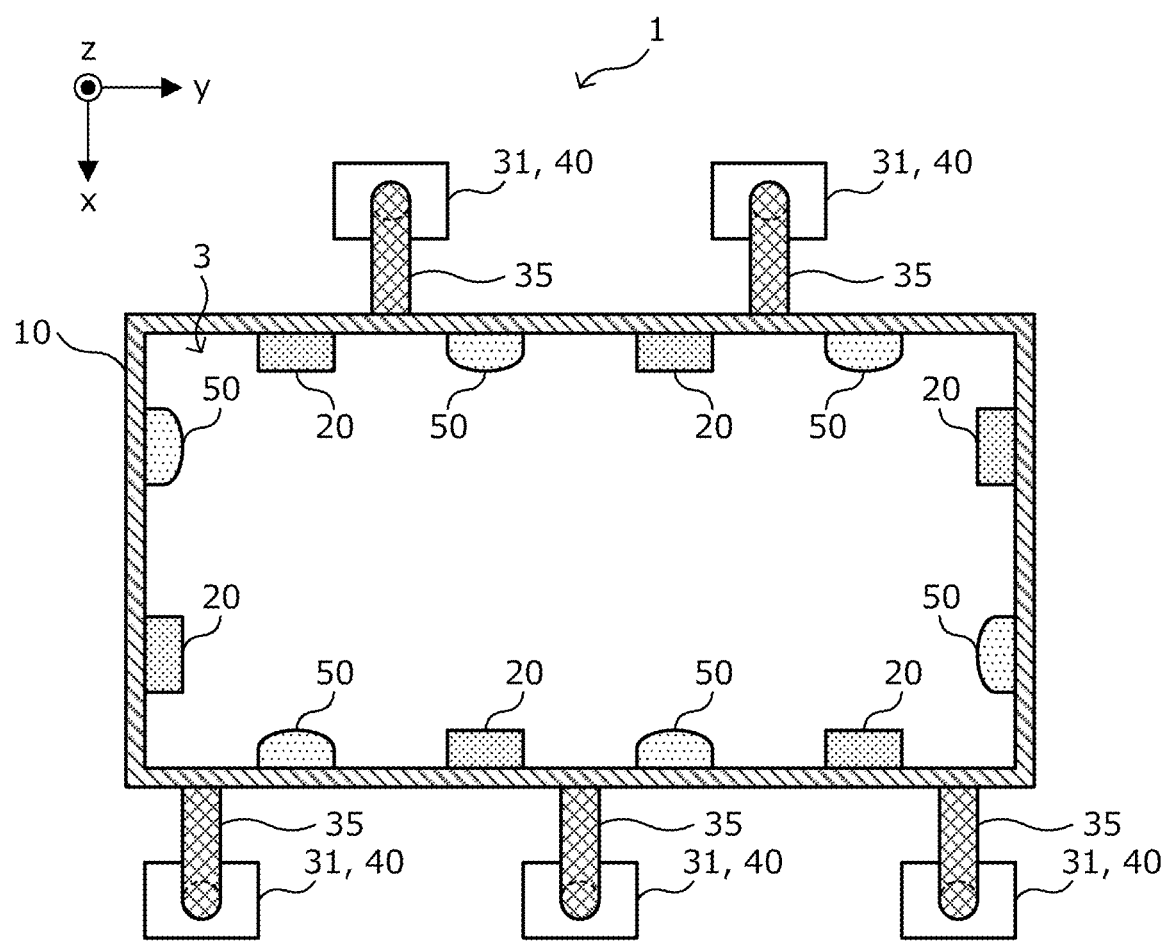
FIG. 1B is an explanatory diagram schematically illustrating an example of a configuration of an ultrasonic treatment apparatus according to the embodiment.

First, an overall configuration of an ultrasonic treatment apparatus according to an embodiment of the present invention will be briefly described while referring to FIG. 1A and FIG. 1B. FIG. 1A and FIG. 1B are explanatory diagrams each schematically illustrating an example of the overall configuration of the ultrasonic treatment apparatus according to the present embodiment.

An ultrasonic treatment apparatus 1 according to the present embodiment is an apparatus that performs a predetermined treatment on a surface of an object to be treated (a portion in contact with a treatment liquid) by using not only the treatment liquid for performing the predetermined treatment on the object to be treated but also ultrasonic waves. The ultrasonic treatment apparatus 1 can be used when various types of treatments such as cleaning, for example, are applied to various types of metal objects represented by steel materials, various types of non-metal objects represented by plastic resin members, and so on. For example, various types of metal objects such as steel plates, steel pipes, and steel wire materials are set to the objects to be treated, and by using the ultrasonic treatment apparatus 1 according to the present embodiment, it is possible to perform a pickling treatment, a degreasing treatment, and a cleaning treatment on these metal objects. Further, the ultrasonic treatment apparatus 1 according to the present embodiment can be used also when performing a water washing treatment after the pickling treatment.

Here, the pickling treatment is a treatment for removing oxide scales formed on a surface of the metal object by using an acid solution, and the degreasing treatment is a treatment for removing oil such as lubricant or machining oil used in processing or the like, by using an organic solvent, an organic solvent emulsified with a surface active agent, or an alkali-based degreasing liquid. These pickling treatment and degreasing treatment are pretreatments performed before applying surface finishing treatments (metal coating treatment, conversion treatment, paint treatment, and so on) to metal objects. The pickling treatment may dissolve a part of base metal. The pickling treatment is also used to dissolve metal objects by etching to improve surface finishing quality. In some cases, the degreasing treatment is provided before the pickling treatment, and degreasing performance in the degreasing treatment may affect the scale removal in the subsequent pickling treatment. Furthermore, the degreasing treatment is also used to improve wettability, which is an index of oil content control as a finishing quality of a final product.

Furthermore, the ultrasonic treatment apparatus 1 according to the present embodiment to be described in detail below, can also be used for cleaning used pipes, tanks and apparatuses that require dirt removal on regular or irregular basis, or the like in addition to the cleaning process in a manufacturing line as described above.

Hereinafter, a detailed explanation will be made by citing a case, as an example, in which a treatment tank that contains a treatment liquid exists as an example of a treatment part, and an object to be treated is provided so as to be filled with the treatment liquid in the treatment tank.

However, the ultrasonic treatment apparatus 1 according to the present embodiment can be employed without separately providing the treatment tank when a member which is previously provided to an apparatus to be a treatment target can be used as a treatment tank, as in a case where an ultrasonic treatment is performed on a pipe provided to a heat exchanger, for example.

As exemplified in FIG. 1A, the ultrasonic treatment apparatus 1 according to the present embodiment has a treatment tank 10, an ultrasonic generator 20, and a treatment liquid circulation path 30. Further, as illustrated in FIG. 1A, the treatment liquid circulation path 30 has a circulating pump 31, a treatment liquid extraction pipe 33, and a treatment liquid discharge pipe 35, and a fine bubble generator 40 is provided in series with the treatment liquid extraction pipe 33. By the fine bubble generator 40, fine bubbles are generated in a treatment liquid 3 that flows through the circulation path 30, and the generated fine bubbles are supplied into the treatment tank 10 together with the treatment liquid 3. Further, the ultrasonic treatment apparatus 1 according to the present embodiment preferably has a curved member 50, in addition to the above configuration.

Here, the fine bubbles are micro bubbles having a bubble diameter of 100 µm or less. The fine bubbles improve a propagation efficiency of ultrasonic waves with respect to an object to be treated, to thereby improve a treatment performance as a core of ultrasonic cavitation.

Further, as schematically illustrated in FIG. 1B, the number and the arrangement of the ultrasonic generator 20, the circulation path 30, the fine bubble generator 40, and the curved member 50 are not particularly limited, and it is possible to arrange these while adjusting the number thereof appropriately, in accordance with a shape and a size of the treatment tank 10. Note that a size of each member in the drawing is emphasized appropriately for simplifying the explanation, and thus actual dimension and ratio between members are not illustrated.

Hereinafter, respective configurations in the ultrasonic treatment apparatus 1 according to the present embodiment will be described in detail.

<Regarding Treatment Tank 10>

In the treatment tank 10 being an example of a treatment part, the treatment liquid 3 used for performing a predetermined treatment on an object to be treated, and the object to be treated itself are accommodated. Accordingly, when the object to be treated accommodated in the treatment tank 10 is immersed in the treatment liquid 3, it exists in a state of being filled with the treatment liquid 3. Types of the treatment liquid 3 contained in the treatment tank 10 are not limited in particular, and it is possible to use a publicly-known treatment liquid according to a treatment to be performed on the object to be treated.

Here, a material used for forming the treatment tank 10 according to the present embodiment is not limited in particular, and it may be various types of metal materials such as iron, steel, and stainless steel plates, various types of plastic resins such as fiber reinforced plastic (FRP) and polypropylene (PP), or various types of bricks such as an acid-resistant brick. Specifically, as the treatment tank 10 composing the ultrasonic treatment apparatus 1 according to the present embodiment, it is possible to newly prepare a treatment tank formed of the material as described above, and it is also possible to use an existing treatment tank in various types of manufacturing lines.

Further, a size of the treatment tank 10 is also not limited in particular, and even a large-sized treatment tank of various shapes such as one with a liquid level depth of about 1 to 2 m and an entire length of about 3 to 25 m, can also be used as the treatment tank 10 of the ultrasonic treatment apparatus 1 according to the present embodiment.

<Regarding Ultrasonic Generator 20>

The ultrasonic generator 20 applies ultrasonic waves at a predetermined frequency to the treatment liquid 3 and the object to be treated accommodated in the treatment tank 10. The ultrasonic generator 20 is not limited in particular, and it is possible to use a publicly-known one such as an ultrasonic transducer connected to a not-illustrated ultrasonic oscillator. Further, although each of FIG. 1A and FIG. 1B illustrates a case where the ultrasonic generator 20 is provided to a wall surface of the treatment tank 10, a position of installing the ultrasonic generator 20 to the treatment tank 10 is also not limited in particular, and it is only required to appropriately install one or a plurality of ultrasonic transducers to the wall surface or a bottom surface of the treatment tank 10. Note that when employing a condition in which ultrasonic waves uniformly propagate in the entire treatment tank 10, balances of oscillation loads of individual ultrasonic transducers become uniform, and thus even if the plurality of ultrasonic transducers are provided, no interference occurs among the generated ultrasonic waves.

A frequency of ultrasonic waves output from the ultrasonic generator 20 is preferably 20 kHz to 200 kHz, for example. When the frequency of ultrasonic waves is less than 20 kHz, ultrasonic propagation may be inhibited by large-sized bubbles generated from a surface of the object to be treated, which may reduce the effect of improving treatment performance provided by ultrasonic waves. Further, when the frequency of ultrasonic waves exceeds 200 kHz, a straight proceeding property of ultrasonic waves when treating the object to be treated becomes excessively strong, and the uniformity of treatment may be lowered. The frequency of ultrasonic waves output from the ultrasonic generator 20 is more preferably 20 kHz to 150 kHz, and still more preferably 25 kHz to 100 kHz.

Note that the frequency of ultrasonic waves to be applied is preferably selected to an appropriate value within the above range according to the object to be treated, and depending on the type of the object to be treated, ultrasonic waves at two or more frequencies may be applied.

Further, the ultrasonic generator 20 preferably has a frequency sweep function, which is capable of applying ultrasonic waves while sweeping the frequency within a predetermined range centered on a certain selected frequency of ultrasonic waves. Such a frequency sweep function enables to achieve the following two additional effects.

When ultrasonic waves are applied to micro bubbles including fine bubbles that exist in a liquid, force called Bjerknes force acts on the micro bubbles, and the micro bubbles are pulled to positions of a point of peak or inflection of ultrasonic waves in accordance with a resonant bubble radius $R_0$ that depends on a frequency. Here, when the frequency of ultrasonic waves changes due to the frequency sweep function possessed by the ultrasonic generator 20, the resonant bubble radius $R_0$ that depends on a frequency varies according to the change in the frequency. Consequently, a bubble diameter when causing cavitation varies, which enables to use a large number of micro bubbles (for example, fine bubbles) as a core of cavitation. Accordingly, the frequency sweep function possessed by the ultrasonic generator 20 further improves the treatment efficiency of the ultrasonic treatment apparatus 1 according to the present embodiment.

Meanwhile, as a general property of ultrasonic waves, a phenomenon that "when a wavelength of the ultrasonic waves becomes ¼ of a wavelength corresponding to a thickness of an irradiation object, the ultrasonic wave transmits through the irradiation object", is known. Therefore, by applying ultrasonic waves while sweeping the frequency within a proper range, it is possible that, when the object to be treated is a tubular body or the like having a hollow portion, for example, ultrasonic waves transmitted into the tubular body can be increased, resulting in that the treatment efficiency of the ultrasonic treatment apparatus 1 according to the present embodiment is further improved.

Here, when the transmittance of ultrasonic waves at a surface of the irradiation object is considered, the ultrasonic waves are vertically incident on the irradiation object, and not only that, they propagate while repeating multiple reflection, and thus a fixed sound field is unlikely to be formed. Nonetheless, in order to create a condition of making ultrasonic waves transmit through a wall surface of the irradiation object, it is preferable to realize a frequency capable of satisfying a condition that "a wavelength of the ultrasonic waves becomes ¼ of a wavelength corresponding to a thickness of the object to be treated", no matter where the object to be treated is positioned. When the present inventors conducted studies regarding a range of such a frequency, it has been clarified that by applying ultrasonic waves while sweeping the frequency within a range of 0.1 kHz to +10 kHz centered on a certain selected frequency, it is possible to realize the transmittance of ultrasonic waves as described above. Based on these reasons, the ultrasonic generator 20 preferably has a frequency sweep function capable of applying ultrasonic waves while sweeping the frequency within a range of ±0.1 kHz to ±10 kHz centered on a certain selected frequency of ultrasonic waves.

<Regarding Circulation Path 30 and Fine Bubble Generator 40>

The circulation path 30 is a path for circulating the treatment liquid 3 contained in the treatment tank 10. As illustrated in FIG. 1A, this circulation path 30 has at least the circulating pump 31 for circulating the treatment liquid 3, the treatment liquid extraction pipe 33 that connects the treatment liquid 3 extracted from the treatment tank 10 to the circulating pump 31, and the treatment liquid discharge pipe 35 that discharges the treatment liquid 3 passed through the circulating pump 31 to the treatment tank 10. Further, as illustrated in FIG. 1A, the fine bubble generator 40 is provided in series with the treatment liquid extraction pipe 33, performs deaeration on the treatment liquid 3 extracted from the treatment tank 10, and generates fine bubbles in the treatment liquid 3.

Here, it is set that, for the circulating pump 31, a general-purpose pump such as, for example, a centrifugal pump or a diaphragm pump is used, and a special pump such as a vacuum pump, a pressure-reducing pump, or a pressure pump is not used.

The fine bubble generator 40 is provided in the middle of the treatment liquid extraction pipe 33 under a negative pressure environment. By the fine bubble generator 40, fine bubbles are generated in the treatment liquid 3 extracted from the treatment tank 10. Note that when the fine bubble generator 40 is provided in the middle of, not the treatment liquid extraction pipe 33, but the treatment liquid discharge pipe 35 under a positive pressure environment, the deaeration of the treatment liquid 3 cannot be performed, resulting in that desired fine bubbles cannot be generated.

Here, an average bubble diameter of the fine bubbles generated in the treatment liquid 3 to be discharged to the treatment tank 10, by the fine bubble generator 40, is preferably 1 µm to 100 µm. Here, the average bubble diameter is a diameter with the maximum number of samples in a number distribution regarding diameters of fine bubbles. When the average bubble diameter is less than 1 µm, there is a case where the fine bubble generator 40 becomes large in size, and it becomes difficult to supply fine bubbles after adjusting bubble diameters. The average bubble diameter is more preferably 2 µm or more, and still more preferably 3 µm or more. This makes it possible to more securely realize the supply of fine bubbles after adjusting the bubble diameters. On the other hand, when the average bubble diameter exceeds 100 µm, a floating speed of fine bubbles is increased, which shortens a lifetime of fine bubbles in a cleaning liquid, and realistic cleaning cannot be performed in some cases. Further, when the bubble diameter is excessively large, the propagation of ultrasonic waves is inhibited by fine bubbles, which sometimes reduces the effect of improving cleaning power of ultrasonic waves. The average bubble diameter is more preferably 90 μm or less, still more preferably 80 μm or less, and yet still more preferably 70 μm or less. This makes it possible to further securely prevent the reduction of the effect of improving the cleaning power of ultrasonic waves.

Further, a bubble number density of fine bubbles in the treatment liquid 3 to be discharged to the treatment tank 10 by the fine bubble generator 40, is preferably $1\times10^3$ pieces/mL to $1\times10^{10}$ pieces/mL. When the bubble number density of fine bubbles is less than $10^3$ pieces/mL, the ultrasonic propagation property improving action by fine bubbles cannot be sufficiently obtained in some cases, and further, the core of ultrasonic cavitation required for the treatment becomes fewer, which is not preferable. The bubble number density of fine bubbles is more preferably $1\times10^3$ pieces/mL or more, still more preferably $5\times10^3$ pieces/mL or more, and yet still more preferably $1\times10^4$ pieces/mL or more. Accordingly, it becomes possible to make the ultrasonic propagation property improving action by fine bubbles exhibit more securely. On the other hand, the bubble number density of fine bubbles exceeding $1\times10^{10}$ pieces/mL is not preferable since the fine bubble generator 40 becomes large in size or the number of fine bubble generators 40 is increased, and thus the supply of fine bubbles is not realistic in some cases. The bubble number density of fine bubbles is more preferably $1\times10^9$ pieces/mL or less, still more preferably $1\times10^8$ pieces/mL or less, and yet still more preferably $1\times10^7$ pieces/mL or less.

Note that when performing an operation using the ultrasonic treatment apparatus 1 according to the present embodiment, it is preferable that control is performed so that the bubble number density of fine bubbles in the treatment liquid contained in the treatment tank 10 coincides with the bubble number density of fine bubbles in the treatment liquid 3 to be discharged to the treatment tank 10, and then various types of treatments as described above are performed.

Further, the fine bubble generator 40 preferably generates fine bubbles so that a proportion of the number of fine bubbles having a bubble diameter of equal to or less than a frequency resonant diameter being a diameter at which resonance with respect to a frequency of ultrasonic waves occurs, in the treatment liquid 3, becomes 70% or more of the number of all fine bubbles that exist in the treatment liquid 3. The reason thereof will be described below.

A natural frequency of various types of bubbles including fine bubbles is called also a Minnaert resonant frequency, and is given by the following formula 101.

[Mathematical formula 1]

$$f_0 = \frac{1}{2\pi R_0}\sqrt{\frac{3\gamma p_\infty}{\rho}}$$ (Formula 101)

Here, in the above formula 101, $f_0$ indicates a specific frequency (Minnaert resonant frequency) of bubble, $R_0$ indicates an average radius of bubble, $p_\infty$ indicates an average pressure of a peripheral liquid, $\gamma$ indicates a heat insulation ratio ($\gamma$ of air=1.4), and $\rho$ indicates a liquid density.

Now, when it is assumed that air exists in a focused bubble, a peripheral liquid of the bubble is water, and a pressure is an atmospheric pressure, a value of a product $f_0 R_0$ between a specific frequency of the bubble and an average radius of the bubble becomes about 3 kHz mm, based on the above formula 101. Accordingly, if a frequency of ultrasonic waves to be applied is 20 kHz, the radius $R_0$ of the bubble resonating with the frequency becomes about 150 μm, so that a frequency resonant diameter $2R_0$ being a diameter of the bubble resonating with the ultrasonic waves at the frequency of 20 kHz becomes about 300 μm. In a similar manner, if a frequency of ultrasonic waves to be applied is 100 kHz, the radius $R_0$ of the bubble resonating with the frequency becomes about 30 μm, so that a frequency resonant diameter $2R_0$ being a diameter of the bubble resonating with the ultrasonic waves at the frequency of 100 kHz becomes about 60 μm.

At this time, a bubble having a radius larger than the resonant radius $R_0$ becomes an inhibition factor. This is because, when the resonance of bubbles including fine bubbles occurs, the bubbles repeatedly expand and contract in a short period of time, and although the bubbles are crushed in the end, if a size of the bubbles is larger than the frequency resonant diameter $2R_0$ at a point of time at which a first acoustic wave passes through the bubbles, ultrasonic waves are diffused at surfaces of the bubbles. On the contrary, if the size of the bubbles is smaller than the frequency resonant diameter $2R_0$ at the point of time at which the first acoustic wave passes through the bubbles, ultrasonic waves can pass through the bubbles without being diffused at the surfaces of the bubbles.

From such a viewpoint, it is preferable that a proportion of the number of fine bubbles having a bubble diameter of equal to or less than the frequency resonant diameter $2R_0$ in the treatment liquid 3 is set to 70% or more of the number of all fine bubbles that exist in the treatment liquid 3. By setting the proportion of the number of fine bubbles having the bubble diameter of equal to or less than the frequency resonant diameter $2R_0$ to 70% or more, it becomes possible to further improve the propagation efficiency of ultrasonic waves. Further, by making first acoustic waves propagate up to a wall surface/bottom surface of the treatment tank 10, diffusion and reflection of ultrasonic waves to the entire treatment tank 10 are repeated, which makes it possible to realize a uniform ultrasonic treatment tank. Further, bubbles with the frequency resonant diameter $2R_0$ or less are also repeatedly expanded and contracted to be crushed when exceeding a predetermined ultrasonic irradiation time, and can contribute to the treatment using cavitation.

Note that the proportion of the number of fine bubbles having the bubble diameter of equal to or less than the frequency resonant diameter $2R_0$ is preferably 98% or less, by considering that there are not a few bubbles that expand right after the generation of fine bubbles. The proportion of the number of fine bubbles having the bubble diameter of equal to or less than the frequency resonant diameter $2R_0$ is more preferably 80% or more and 98% or less.

Here, the average bubble diameter and the bubble number density of fine bubbles can be measured by publicly-known devices such as an in-liquid particle counter and a bubble diameter distribution measuring device.

Further, in order to realize both of more uniform ultrasonic propagation and high cleaning performance in the ultrasonic treatment apparatus 1 according to the present embodiment, a dissolved gas amount (more specifically, a dissolved oxygen amount) in the treatment liquid 3 is preferably controlled to a proper value by the fine bubble generator 40. Such a proper dissolved gas amount in the treatment liquid 3 is preferably 1% to 50% of a saturated dissolved amount in the treatment liquid 3. When the dissolved gas amount is less than 1% of the saturated dissolved amount, it becomes difficult to generate bubbles as fine bubbles, and in addition to that, the cavitation due to ultrasonic waves does not occur and thus a treatment performance improving ability (surface treatment performance improving ability) provided by ultrasonic waves cannot be exhibited, which is not preferable. On the other hand, when the dissolved gas amount exceeds 50% of the saturated dissolved amount, the dissolved gas inhibits the propagation of ultrasonic waves, and the uniform ultrasonic propagation to the entire treatment tank 10 is inhibited, which is not preferable. The dissolved gas amount (dissolved oxygen amount) in the treatment liquid 3 is preferably 5% to 40% or less of the saturated dissolved amount in the treatment liquid 3.

Here, when a temperature of the treatment liquid 3 changes, the saturated dissolved amount in the treatment liquid 3 changes. Further, a difference in a momentum of molecules of the liquid composing the treatment liquid 3 (for example, a momentum of water molecules) caused by a temperature change in the treatment liquid 3, exerts an influence on the propagation property. Concretely, when the temperature is low, the momentum of molecules of the liquid composing the treatment liquid 3 is small, which makes easier for ultrasonic waves to be propagated, and the saturated dissolved amount (dissolved oxygen amount) in the treatment liquid 3 becomes high. Therefore, it is preferable to appropriately control the temperature of the treatment liquid 3 so as to be able to realize a desired dissolved gas amount (dissolved oxygen amount) that falls within the above-described range. Although depending also on concrete contents of treatment to be carried out by using the treatment liquid 3, the temperature of the treatment liquid 3 is preferably about 20° C. to 85° C., for example.

Concretely, the dissolved gas amount in the treatment liquid 3 is preferably 0.1 ppm or more and 11.6 ppm or less, and more preferably 1.0 ppm or more and 11.0 ppm or less, for example. For this reason, the circulation path 30 and the fine bubble generator 40 according to the present embodiment control the temperature of the treatment liquid 3 and the dissolved gas amount in the treatment liquid 3 so that the dissolved gas amount in the treatment liquid 3 contained in the treatment tank 10 takes a value within the range as described above.

Here, the dissolved gas amount in the treatment liquid 3 can be measured by a diaphragm electrode method and a publicly-known device such as an optical dissolved oxygen meter.

Note that dissolved gases in an aqueous solution are mainly oxygen, nitrogen, carbon dioxide, helium, and argon, and oxygen and nitrogen occupy a large part thereof, although being influenced by a temperature and components of the aqueous solution. Further, a dissolved gas which may exert an influence on various types of ultrasonic treatments and which is focused in the present embodiment, is mainly oxygen.

The average bubble diameter and the bubble number density of fine bubbles as described above, and the dissolved gas amount in the treatment liquid 3 are realized when the structure of the fine bubble generator 40 to be described in detail hereinbelow is set properly, to thereby properly control a pressure reduction-release cycle of the treatment liquid 3.

Hereinbelow, the fine bubble generator 40 according to the present embodiment, and the treatment liquid extraction pipe 33 to which the fine bubble generator 40 is provided, will be described in detail while referring to FIG. 2 to FIG. 14.

Figure 11:
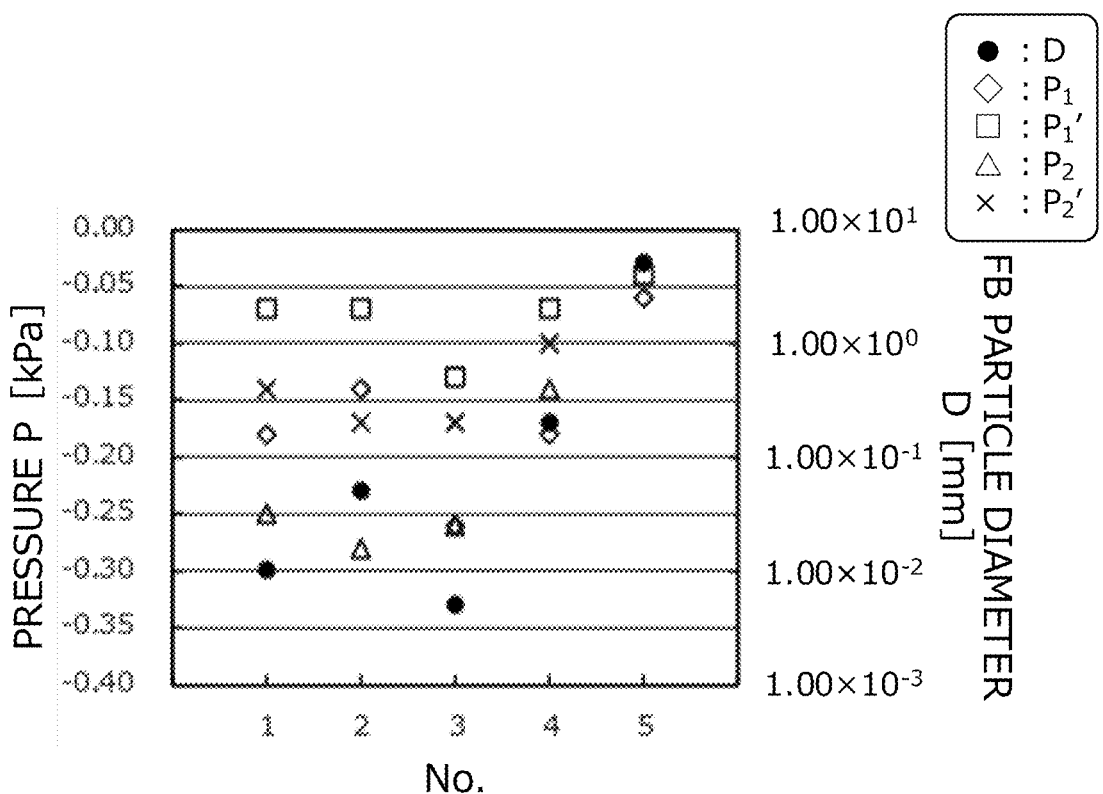
FIG. 11 is a graph diagram for explaining the fine bubble generators.
Figure 12:
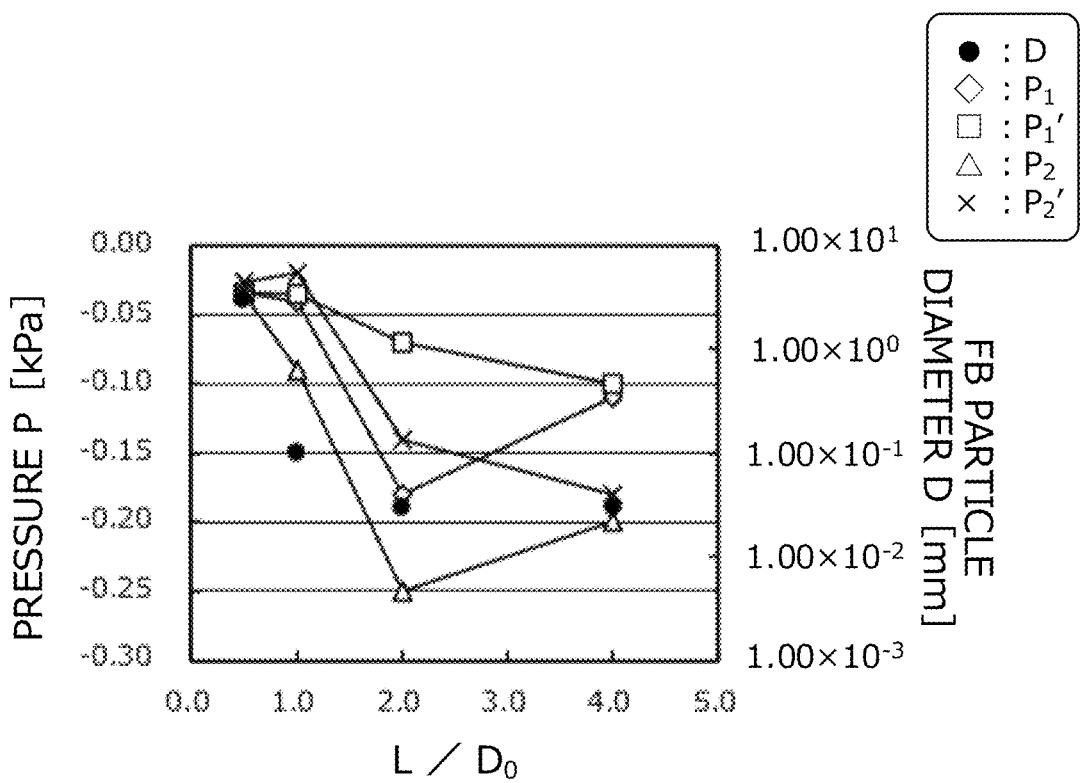
FIG. 12 is a graph diagram for explaining the fine bubble generator.
Figure 13:
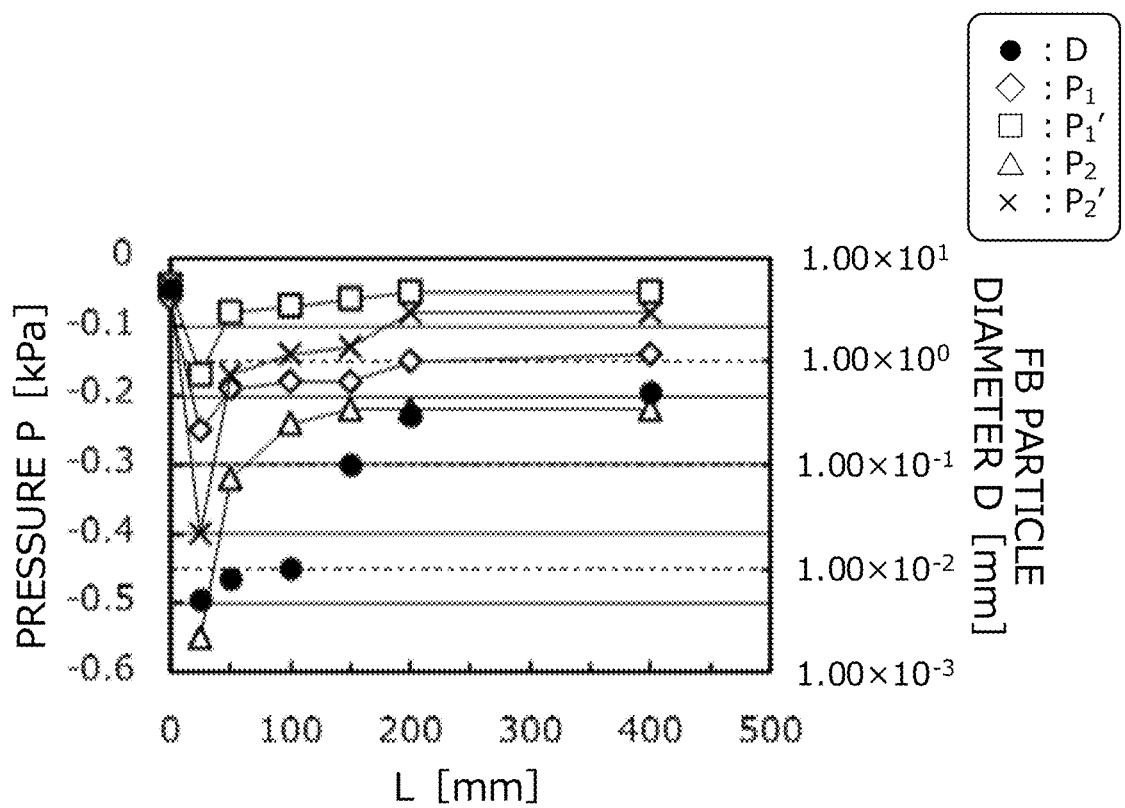
FIG. 13 is a graph diagram for explaining the fine bubble generator.
Figure 14:
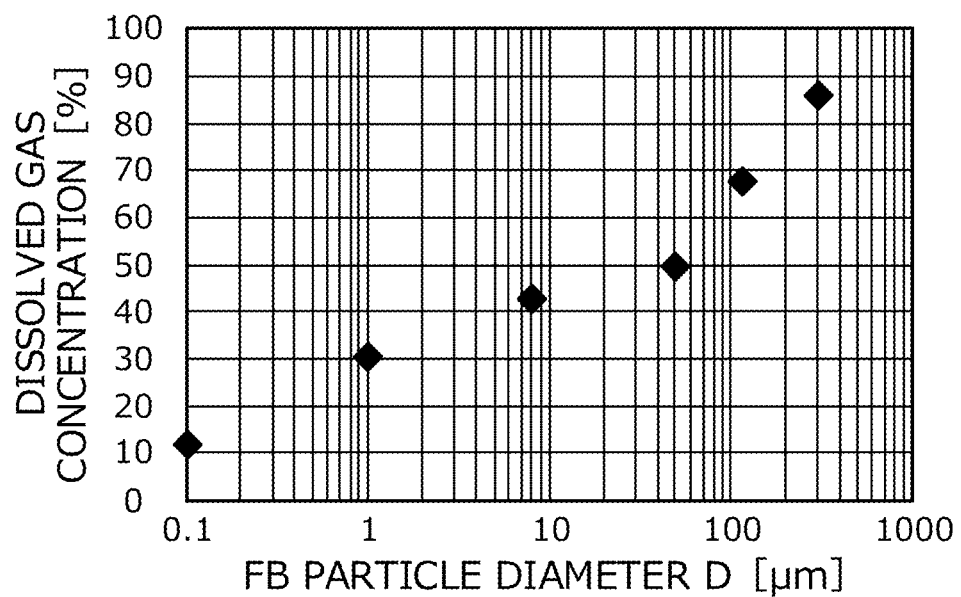
FIG. 14 is a graph diagram illustrating a relation between a fine bubble particle diameter and a dissolved oxygen concentration.

FIG. 2 to FIG. 8 are explanatory diagrams for explaining the fine bubble generator provided to the ultrasonic treatment apparatus according to the present embodiment. FIG. 9A to FIG. 9E are graph diagrams each illustrating a state of pressure change inside the fine bubble generator. FIG. 10A to FIG. 10D are graph diagrams each illustrating a state of pressure distribution inside the fine bubble generator. FIG. 11 to FIG. 13 are graph diagrams for explaining the fine bubble generators. FIG. 14 is a graph diagram illustrating a relation between a fine bubble particle diameter and a dissolved oxygen concentration.

Figure 2:
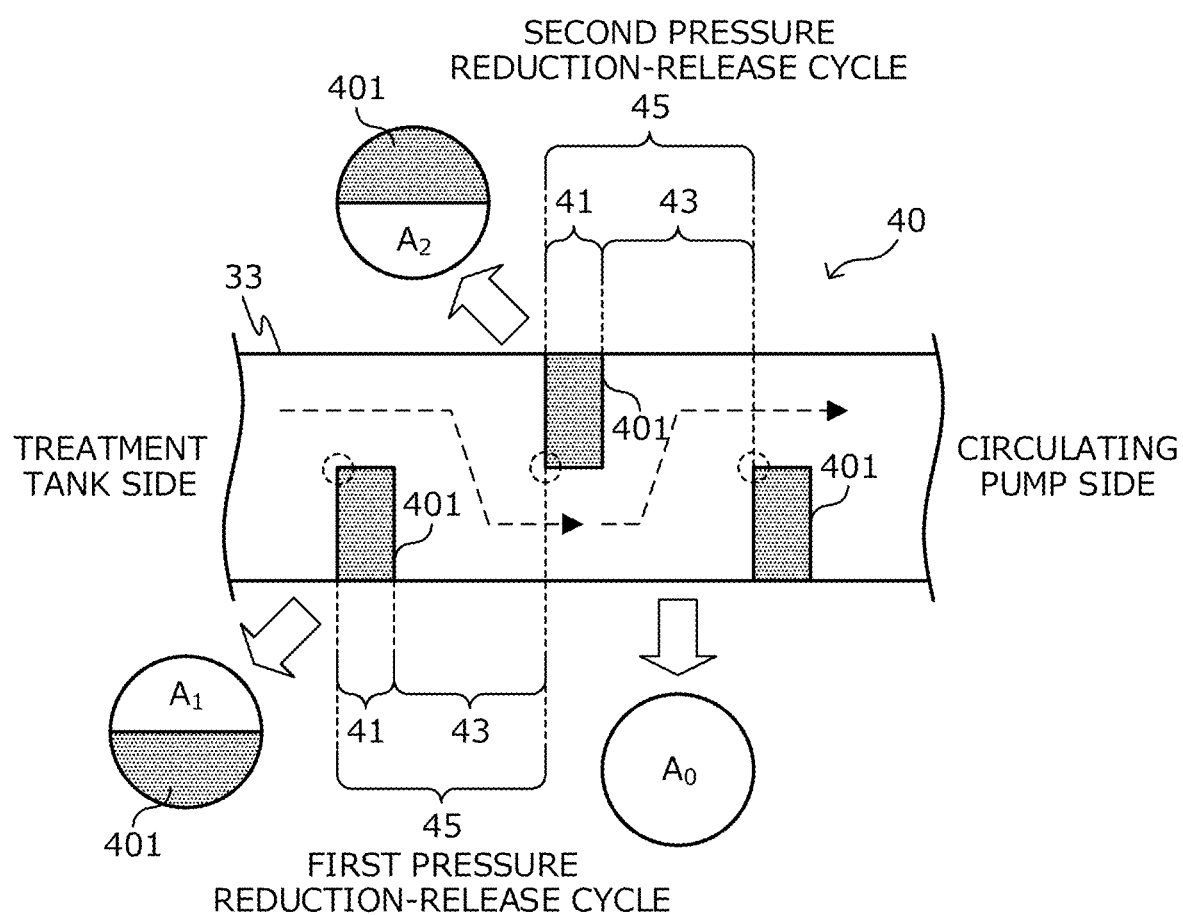
FIG. 2 is an explanatory diagram for explaining a fine bubble generator provided to the ultrasonic treatment apparatus according to the embodiment.

As schematically illustrated in FIG. 2, the fine bubble generator 40 according to the present embodiment has two or more narrow portions 41 each having an opening flow path of the treatment liquid 3 (a path through which the treatment liquid 3 flows) with a size narrower than an inside diameter of the treatment liquid extraction pipe 33, in which the opening flow paths of the narrow portions 41 adjacent to each other are configured to prevent the treatment liquid 3 from proceeding straight. As will be described below in detail, at the narrow portion 41, the treatment liquid 3 is subjected to pressure reduction to be turned into a pressure-reduced state, and at a portion corresponding to one between the narrow portions 41 adjacent to each other (including also a zone which is led to a narrow portion positioned on the side closest to the circulating pump 31, and in which no obstacle or the like exists, the portion being also called a "non-narrow portion 43", hereinbelow), the pressure of the treatment liquid 3 under the pressure-reduced state is released. Accordingly, the narrow portion 41 can be considered as a pressure reduction zone in which the treatment liquid 3 is subjected to pressure reduction, and the non-narrow portion 43 can be considered as a release zone in which the pressure of the treatment liquid 3 under the pressure-reduced state is released. Further, the narrow portion 41 and the non-narrow portion 43 compose a pressure reduction-release cycle in which the pressure reduction and release of the treatment liquid 3 are performed.

At each of the narrow portions 41, an obstacle for the treatment liquid 3 is provided to an inner wall of the treatment liquid extraction pipe 33 so as to narrow a flow path of the treatment liquid 3, and at each of the non-narrow portions 43, such an obstacle does not exist so that the entire opening cross section of the treatment liquid extraction pipe 33 becomes a flow path of the treatment liquid 3.

When the number N of the narrow portion 41 as described above is only one, it is not possible to sufficiently reduce the pressure of the treatment liquid 3, and further, a diameter of bubbles generated by cavitation becomes large, resulting in that fine bubbles that further comply with the treatment using ultrasonic waves cannot be generated in a stable manner. Note that the number N of the narrow portions 41 in the fine bubble generator 40 is preferably set to 10 or less. When the number N of the narrow portions 41 exceeds 10, a pressure loss occurs, and an influence on the bubble diameter of fine bubbles becomes small, which is not preferable. The number N of the narrow portions 41 in the fine bubble generator 40 is more preferably 2 or more and 8 or less, still more preferably 2 or more and 6 or less, and yet still more preferably 2 or more and 4 or less.

When such narrow portions 41 exist in the treatment liquid extraction pipe 33, it is possible to provide a further efficient pressure reduction zone under a negative pressure environment to make the dissolved gas in the treatment liquid 3 turn into bubbles, and by providing the narrow portions 41 in a repeated manner, it is possible to micronize the generated bubbles. The negative pressure environment in the treatment liquid extraction pipe 33 is preferably within a range of −0.05 MPa to −0.10 MPa.

In the fine bubble generator 40 according to the present embodiment, when an opening cross-sectional area of the inside diameter of the treatment liquid extraction pipe 33 is set to $A_0$, and an opening cross-sectional area of the inside diameter of the treatment liquid extraction pipe 33 at an i-th (i is an integer of 1 or more, and corresponds to the number of the narrow portions 41) narrow portion 41 from the treatment tank 10 side toward the circulating pump 31 side is set to $A_i$, an opening cross-sectional area ratio $R_i$ of the i-th narrow portion 41 represented as $A_i/A_0$ satisfies a relation represented by $0.10 \leq (A_i/A_0) \leq 0.50$, in a mutually independent manner.

Here, the opening cross-sectional area $A_i$ has a maximum value of an area of a portion to be an opening flow path at the i-th narrow portion 41 (more specifically, a maximum value of an area of a portion to be an opening flow path when the i-th narrow portion 41 is projected on a plane perpendicular to a pipe axis direction).

FIG. 2 illustrates a case where each of the narrow portions 41 is realized by a projecting member 401 provided to project from an inner surface of the treatment liquid extraction pipe 33 so as to realize the desired opening cross-sectional area ratio $(A_i/A_0)$. In the example illustrated in FIG. 2, an opening cross-sectional area $A_1$ of the narrow portion 41 in a first pressure reduction-release cycle 45 satisfies, with respect to an opening cross-sectional area $A_0$ of the non-narrow portion 43, a relation represented by $0.10 \leq (A_1/A_0) \leq 0.50$. In like manner, an opening cross-sectional area $A_2$ of the narrow portion 41 in a second pressure reduction-release cycle 45 satisfies, with respect to an opening cross-sectional area $A_0$ in the release zone 43, a relation represented by $0.10 \leq (A_2/A_0) \leq 0.50$.

When the opening cross-sectional area ratio $(A_i/A_0)$ becomes less than 0.10, the flow path of the treatment liquid 3 at the narrow portion 41 becomes excessively narrow, resulting in that a sufficient flow path cannot be secured, which may cause a trouble in circulating the treatment liquid, and a pump load may cause breakdown. The opening cross-sectional area ratios $(A_i/A_0)$ at the respective narrow portions 41 are preferably 0.15 or more, and more preferably 0.20 or more, in a mutually independent manner. On the other hand, when the opening cross-sectional area ratio $(A_i/A_0)$ exceeds 0.50, the flow path of the treatment liquid 3 at the narrow portion 41 is enlarged too much, resulting in that the pressure reduction cannot be performed sufficiently, and it is not possible to generate fine bubbles with a proper bubble diameter. The opening cross-sectional area ratios $(A_i/A_0)$ at the respective narrow portions 41 are preferably 0.45 or less, and more preferably 0.40 or less, in a mutually independent manner.

Figure 3:
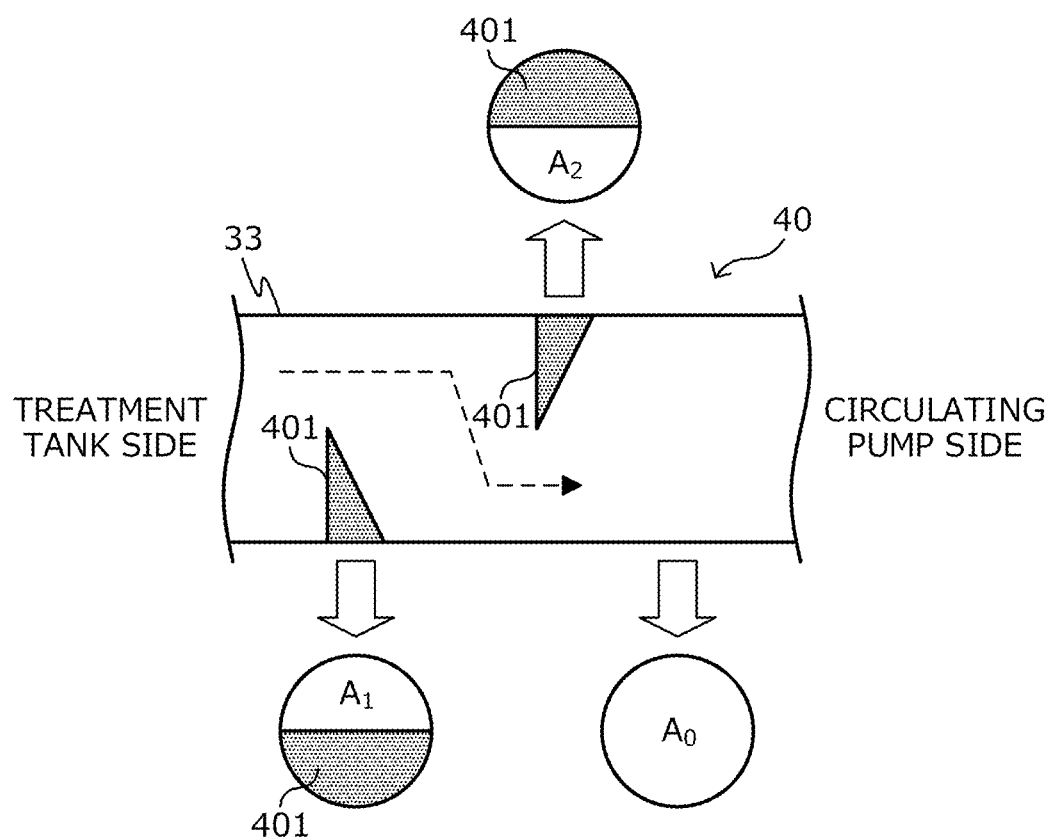
FIG. 3 is an explanatory diagram for explaining a fine bubble generator provided to the ultrasonic treatment apparatus according to the embodiment.

Further, the following results of simulation conducted by the present inventors reveal that generation of a negative pressure starts from an edge of an obstacle (in an example illustrated in FIG. 2, an edge of the projecting member 401 surrounded by a dotted line, which is positioned on the treatment tank 10 side). For this reason, the projecting member 401 may have an edge shape as illustrated in FIG. 3. Note that in a case of the projecting member 401 having the edge shape as illustrated in FIG. 3, generation of a negative pressure starts from a portion at which the size of the opening flow path becomes the narrowest. By making the projecting member 401 have the shape as illustrated in FIG. 3, it becomes possible to more securely generate the negative pressure.

Figure 4:
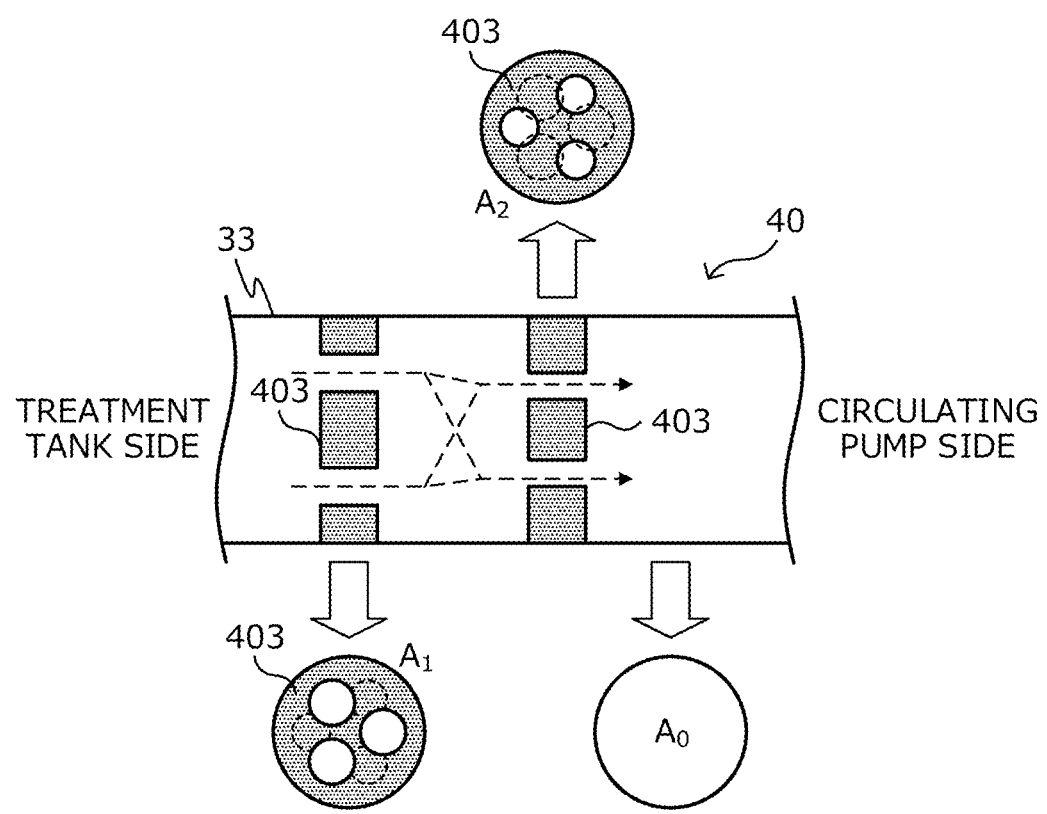
FIG. 4 is an explanatory diagram for explaining a fine bubble generator provided to the ultrasonic treatment apparatus according to the embodiment.

The narrow portion 41 may be realized by, not the projecting member 41 as illustrated in FIG. 2 and FIG. 3, but an opening member 403 provided with one or a plurality of through holes so as to realize the desired opening cross-sectional area ratio $(A_i/A_0)$, as illustrated in FIG. 4, for example. Also in such a case, by considering an arrangement of the opening member 403 in the treatment liquid extraction pipe 33, it is possible to configure an opening flow path of the narrow portion 41 so as to prevent the treatment liquid 3 from proceeding straight. Here, the description of "the treatment liquid 3 does not proceed straight" means a state in which 50% or more of an opening flow path at the narrow portion 41 is blocked by a non-opening portion of the adjacent narrow portion 41, when seen from a pipe axis direction. Note that a shape and an arrangement method of the through hole in the opening member 403 are not particularly limited, and may be appropriately decided so as to be able to realize the desired opening cross-sectional area ratio $(A_i/A_0)$.

Further, in order to more securely prevent the treatment liquid 3 from proceeding straight, it is more preferable that, when the treatment liquid extraction pipe 33 is seen from its pipe axis direction, positions of opening flow paths of the adjacent narrow portions 41 are not overlapped with each other.

Figure 5:
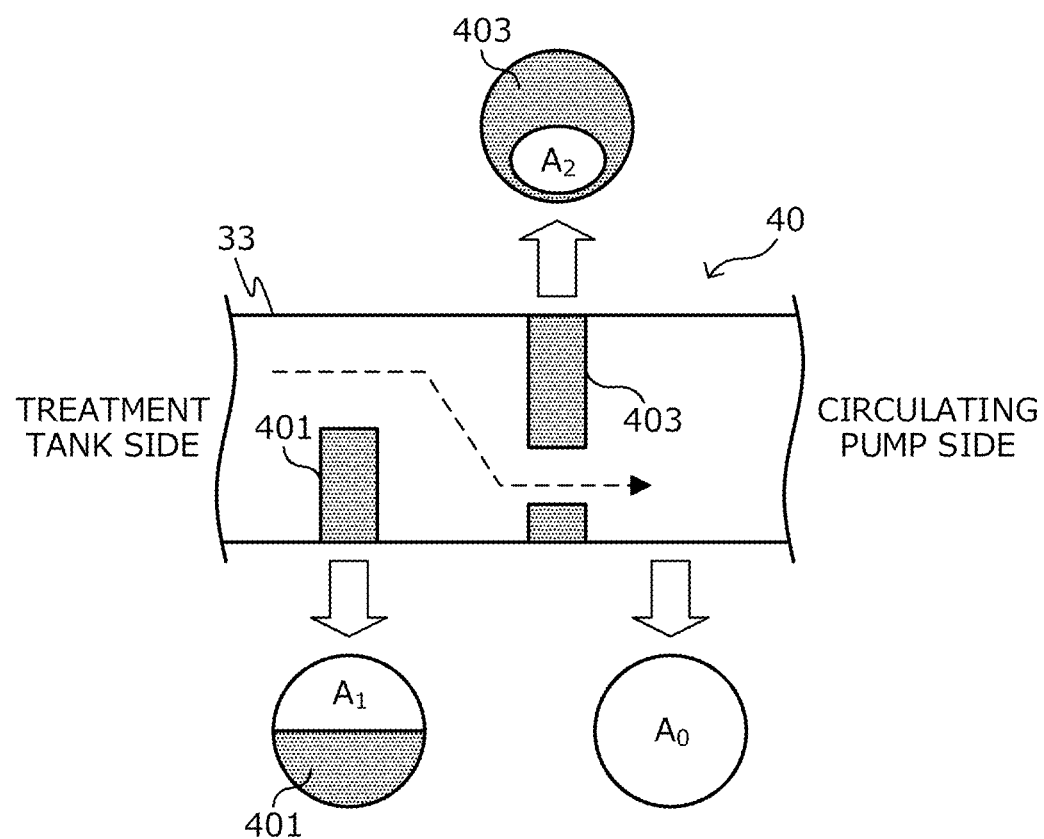
FIG. 5 is an explanatory diagram for explaining a fine bubble generator provided to the ultrasonic treatment apparatus according to the embodiment.

Further, as the narrow portion 41, it is also possible to combine the projecting member 401 as disclosed in FIG. 2 and FIG. 3 and the opening member 403 as disclosed in FIG. 4, as illustrated in FIG. 5. Specifically, at least one of the narrow portions 41 may be realized by the projecting member 401, and it may also be realized by the opening member 403.

Figure 6:
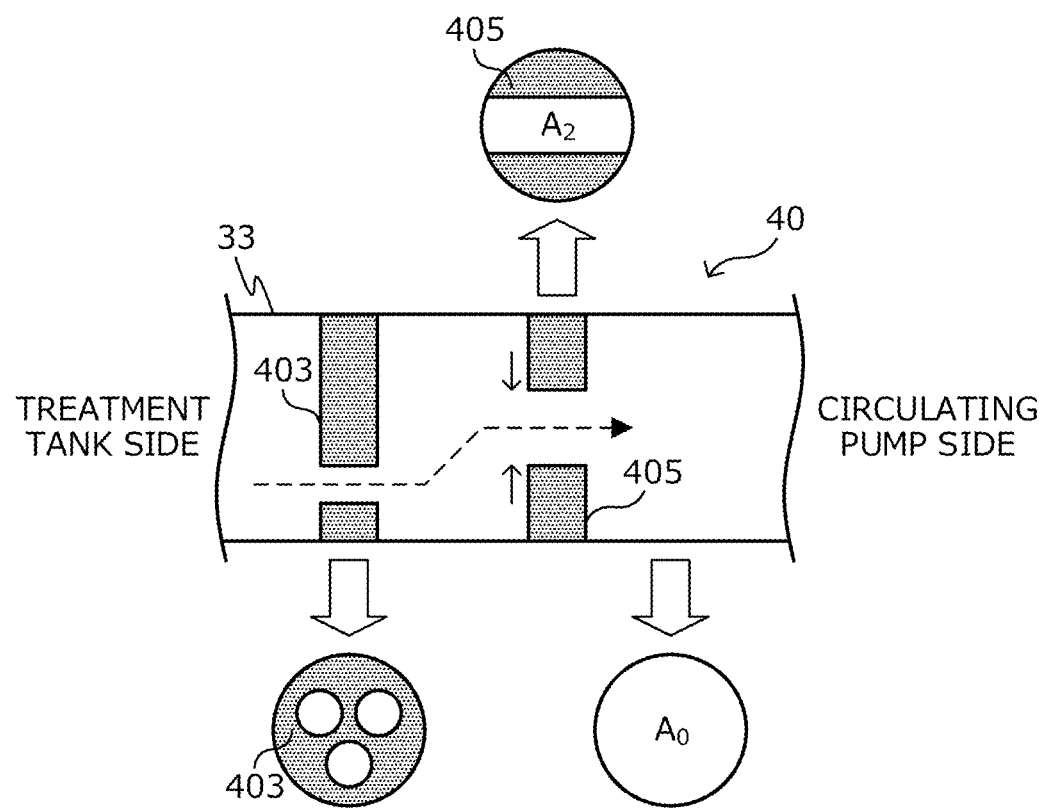
FIG. 6 is an explanatory diagram for explaining a fine bubble generator provided to the ultrasonic treatment apparatus according to the embodiment.

Furthermore, it is also possible to use, as at least one of the narrow portions 41, a movable projecting member 405 capable of changing its degree of projection with respect to a flow path, within a range of the predetermined opening cross-sectional area ratio $(A_i/A_0)$, as schematically illustrated in FIG. 6. Note that in FIG. 6, one of the narrow portions 41 is realized by the opening member 403, but it may also be realized by the projecting member 401.

Figure 7:
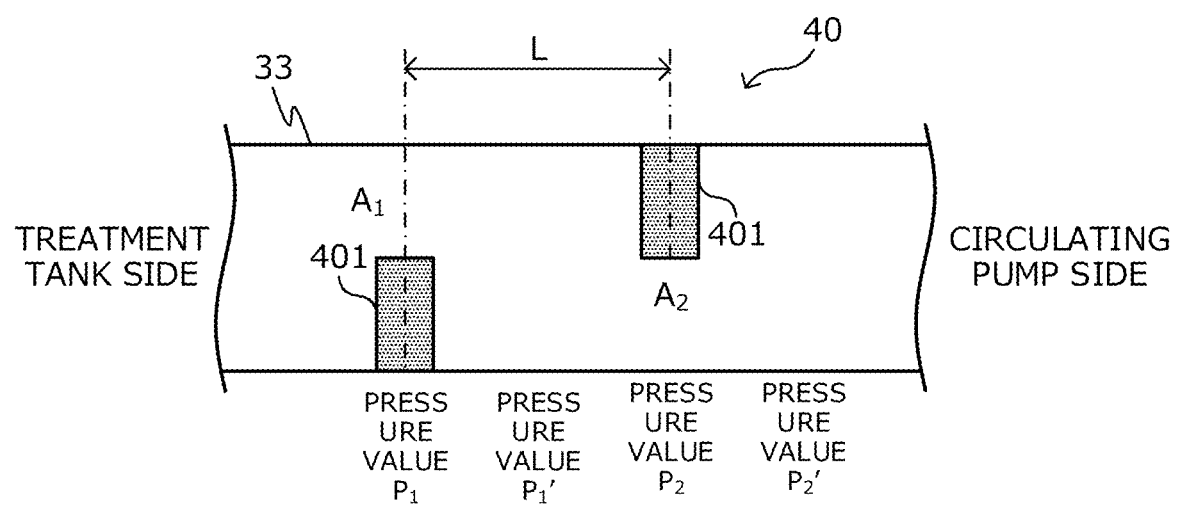
FIG. 7 is an explanatory diagram for explaining a fine bubble generator provided to the ultrasonic treatment apparatus according to the embodiment.

The present inventors constructed various types of models of the fine bubble generator 40 having continuously-provided two pressure reduction-release cycles 45, as illustrated in FIG. 7 as an example, and by using COMSOL Multiphysics being commercially available general-purpose physical simulation software, various types of simulations regarding the fine bubble generators 40 were carried out.

Here, as illustrated in FIG. 7, each narrow portion of the fine bubble generator 40 was set to be realized by the projecting member 401, opening cross-sectional areas at respective narrow portions were set to $A_1$ and $A_2$, respectively, and an opening cross-sectional area at a non-narrow portion (an opening cross-sectional area of the treatment liquid extraction pipe 33) was set to $A_0$. Note that an inside diameter $D_0$ of the treatment liquid extraction pipe 33 giving the opening cross-sectional area $A_0$ at the non-narrow portion was set to 50 mm. Further, a first narrow portion and a second narrow portion were set to be adjacent to each other with a separation distance L of 100 [mm]. Here, the separation distance L is set to a distance between center portions of the adjacent narrow portions. Pressures of the treatment liquid 3 at the first narrow portion and a first non-narrow portion were set to $P_1$ and $P_1'$, respectively, and pressures of the treatment liquid 3 at the second narrow portion and a second non-narrow portion were set to $P_2$ and $P_2'$, respectively.

Here, the models of the fine bubble generator 40 constructed in the present simulation include five types illustrated in FIG. 8, in which models of No. 4 and No. 5 are models of the fine bubble generator 40 being out of the range of the present invention. In each of the models, the opening cross-sectional area ratios $(A_2/A_0)$ and $(A_2/A_0)$ at the respective narrow portions were respectively set to values indicated in FIG. 8, and then a pressure on an inlet side of the fine bubble generator 40 was set to 0 MPa in common and a flow velocity of the treatment liquid 3 on an outlet side was set to 0.15 m/second in common. Note that in the following simulation, the pressure on the inlet side of the fine bubble generator 40 is set to 0 Pa, which is not a negative pressure, but even when the pressure is set to the negative pressure, it is possible to obtain a result in which a relation of pressure difference (gap) at the following respective positions is maintained, which has been confirmed separately.

Particle diameters (average bubble diameters) of fine bubbles (which will be abbreviated to "FB" in some cases) on the outlet side of the fine bubble generators 40 in the present simulation are collectively shown in FIG. 8. Further, states of pressure change inside the fine bubble generators 40 in the models of No. 1, No. 2, No. 3, No. 4, and No. 5 are illustrated in FIG. 9A to FIG. 9E. Besides, states of pressure distribution inside the fine bubble generators 40 in the models of No. 1, No. 2, No. 3, and No. 5 are illustrated in FIG. 10A to FIG. 10D.

Figure 9A:
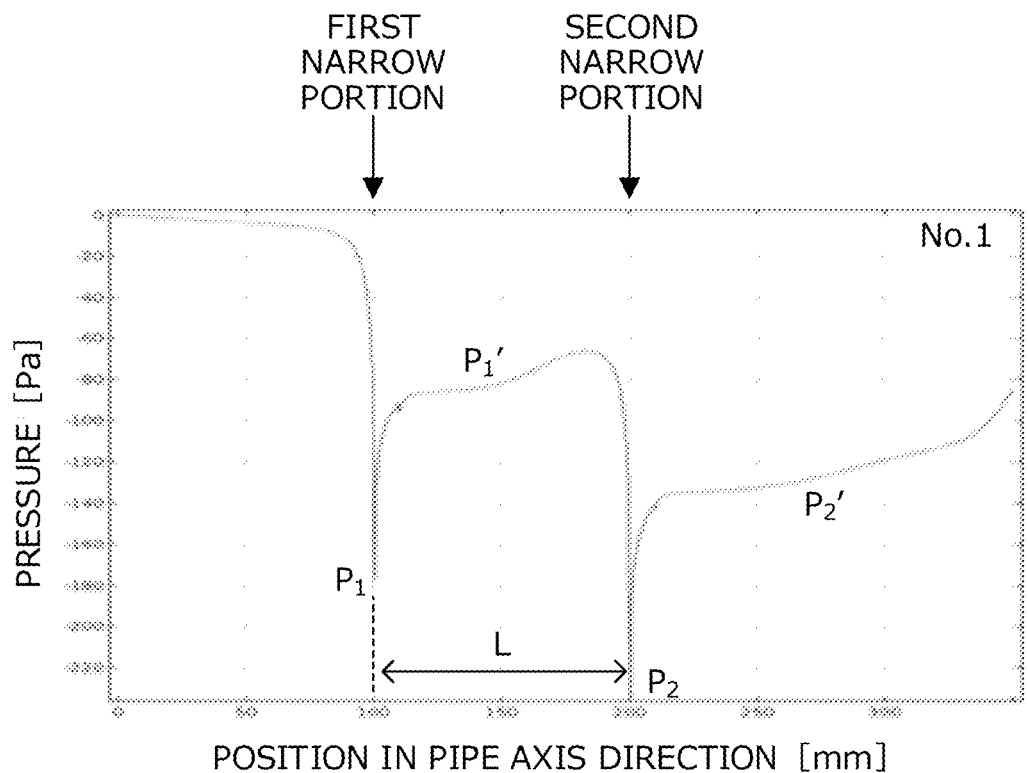
FIG. 9A is a graph diagram illustrating a state of pressure change inside the fine bubble generator.

First, regarding the model indicated as No. 1 in FIG. 8, the result illustrated in FIG. 9A will be referred to. It can be confirmed that a pressure of the treatment liquid 3 flowed in the fine bubble generator 40 from the inlet side of the fine bubble generator 40 was reduced to $P_1$=about −180 Pa at the first narrow portion, the pressure then raised to $P_1'$=about −80 Pa to −60 Pa at the first non-narrow portion, the pressure was further reduced to $P_2$=about −240 Pa at the second narrow portion, and then the pressure raised to $P_2'$=about −140 Pa to −80 Pa at the second non-narrow portion. Further, it can be confirmed from FIG. 8 that the particle diameter of the fine bubbles obtained at this time was 0.010 mm (=10 μm). Further, when focusing on the pressure distribution illustrated in FIG. 10A, a starting point of an isobar (a line segment connecting positions indicating the same pressure value) in FIG. 10A corresponds to an end point of the projecting member 401 positioned on an upstream side, and thus as described before, it can be confirmed that generation of the negative pressure starts from the edge of the obstacle (the edge of the projecting member 401 positioned on the treatment tank 10 side).

Figure 9B:
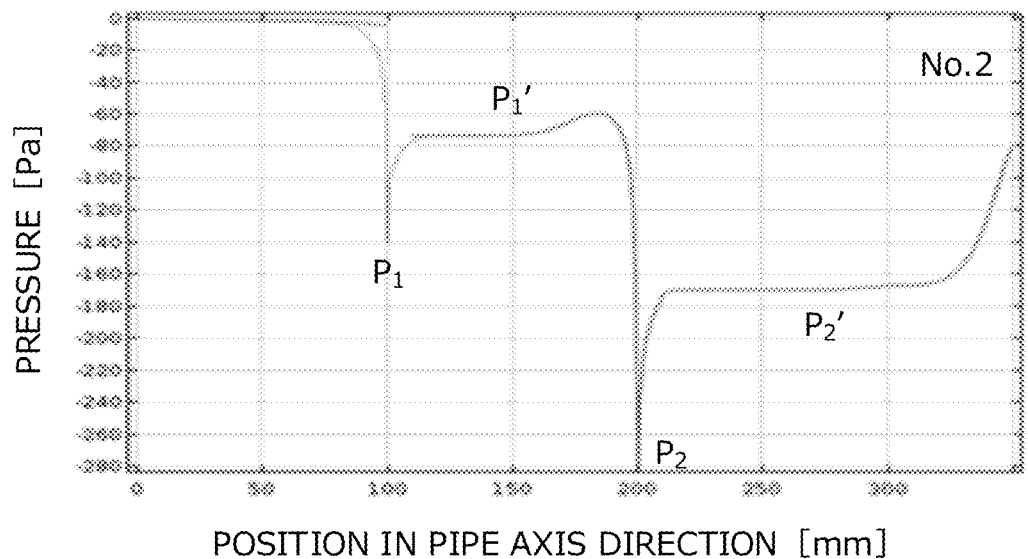
FIG. 9B is a graph diagram illustrating a state of pressure change inside the fine bubble generator.

Further, regarding the model indicated as No. 2 in FIG. 8, the result illustrated in FIG. 9B will be referred to. It can be confirmed that a pressure of the treatment liquid 3 flowed in the fine bubble generator 40 from the inlet side of the fine bubble generator 40 was reduced to $P_1$=about −140 Pa at the first narrow portion, the pressure was then released at the first non-narrow portion, the pressure was further reduced to $P_2$=about −280 Pa at the second narrow portion, and then the pressure was released at the second non-narrow portion. Further, it can be confirmed from FIG. 8 that the particle diameter of the fine bubbles obtained at this time was 0.050 mm (=50 μm). Further, when focusing on the pressure distribution illustrated in FIG. 10B, also in the present model, a starting point of an isobar (a line segment connecting positions indicating the same pressure value) in FIG. 10B corresponds to an end point of the projecting member 401 positioned on the upstream side, in a similar manner to the model of No. 1, and thus as described before, it can be confirmed that generation of the negative pressure starts from the edge of the obstacle (the edge of the projecting member 401 positioned on the treatment tank 10 side).

Figure 9C:
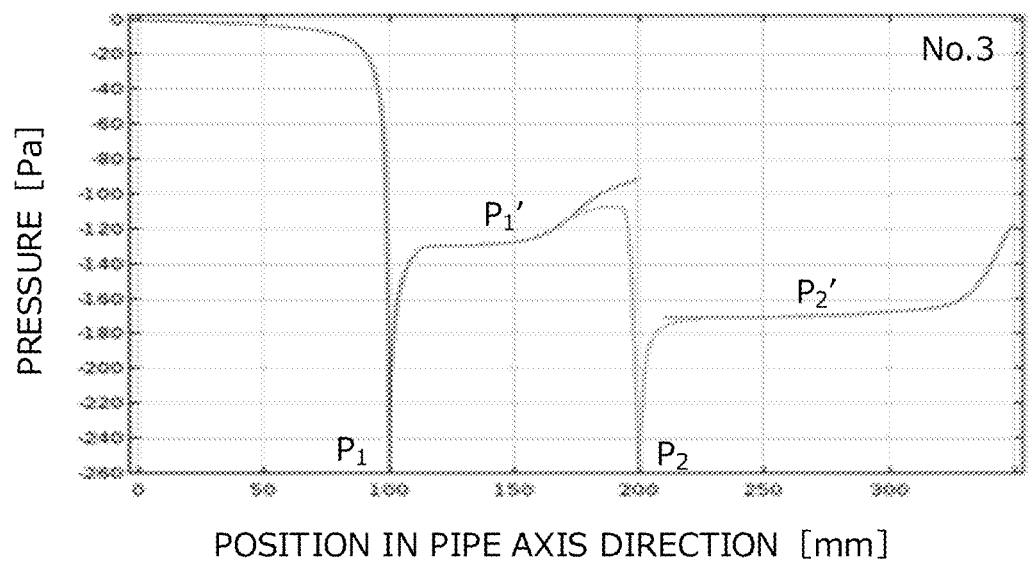
FIG. 9C is a graph diagram illustrating a state of pressure change inside the fine bubble generator.

Regarding the model indicated as No. 3 in FIG. 8, the result illustrated in FIG. 9C will be referred to. It can be confirmed that a pressure of the treatment liquid 3 flowed in the fine bubble generator 40 from the inlet side of the fine bubble generator 40 was reduced to $P_1$=about −260 Pa at the first narrow portion, the pressure was then released at the first non-narrow portion, the pressure was further reduced to $P_2$=about −260 Pa at the second narrow portion, and then the pressure was released at the second non-narrow portion. Further, it can be confirmed from FIG. 8 that the particle diameter of the fine bubbles obtained at this time was 0.005 mm (=5 μm). Further, when focusing on the pressure distribution illustrated in FIG. 10C, also in the present model, a starting point of an isobar (a line segment connecting positions indicating the same pressure value) in FIG. 10C corresponds to an end point of the projecting member 401 positioned on the upstream side, in a similar manner to the model of No. 1, and thus as described before, it can be confirmed that generation of the negative pressure starts from the edge of the obstacle (the edge of the projecting member 401 positioned on the treatment tank 10 side).

Figure 9D:
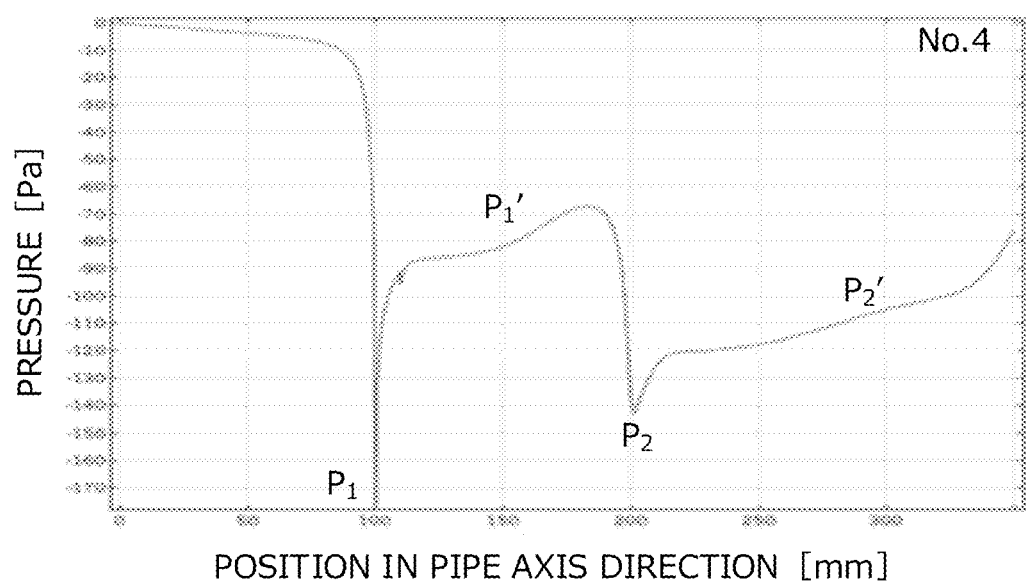
FIG. 9D is a graph diagram illustrating a state of pressure change inside the fine bubble generator.

On the other hand, regarding the model indicated as No. 4 in FIG. 8 in which the projecting members 401 are provided so as to allow the treatment liquid 3 to proceed straight, the result illustrated in FIG. 9D will be referred to. It can be confirmed that a pressure of the treatment liquid 3 flowed in the fine bubble generator 40 from the inlet side of the fine bubble generator 40 was reduced to $P_1$=about −180 Pa at the first narrow portion, the pressure then raised to $P_1'$=about −90 Pa to −70 Pa at the first non-narrow portion, the pressure was reduced to $P_2$=about −140 Pa at the second narrow portion, and then the pressure raised to $P_2'$=about −120 Pa to −70 Pa at the second non-narrow portion. Further, it can be confirmed from FIG. 8 that the particle diameter of the fine bubbles obtained at this time was 0.200 mm (=200 m).

Figure 9E:
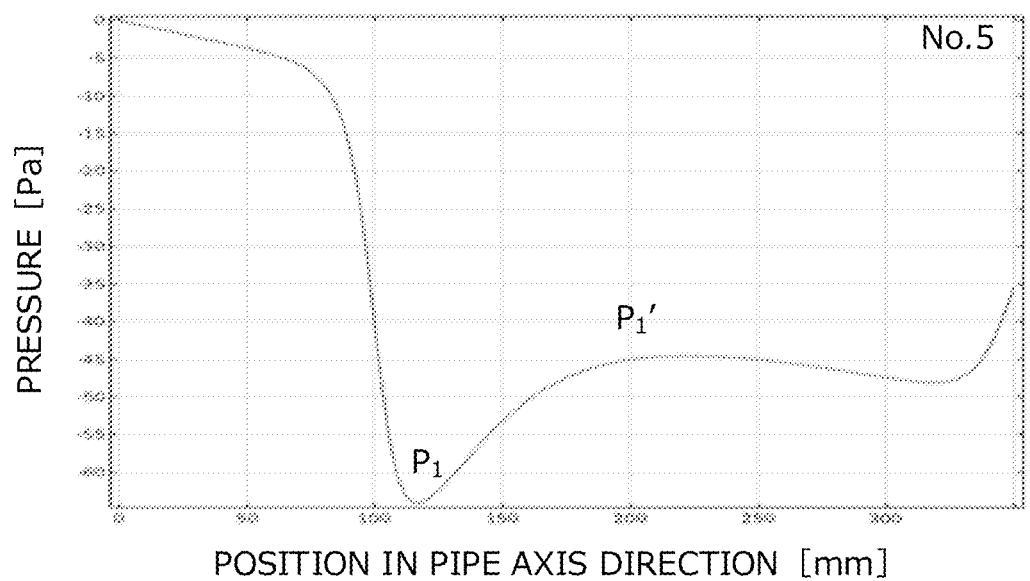
FIG. 9E is a graph diagram illustrating a state of pressure change inside the fine bubble generator.
Figure 10A:
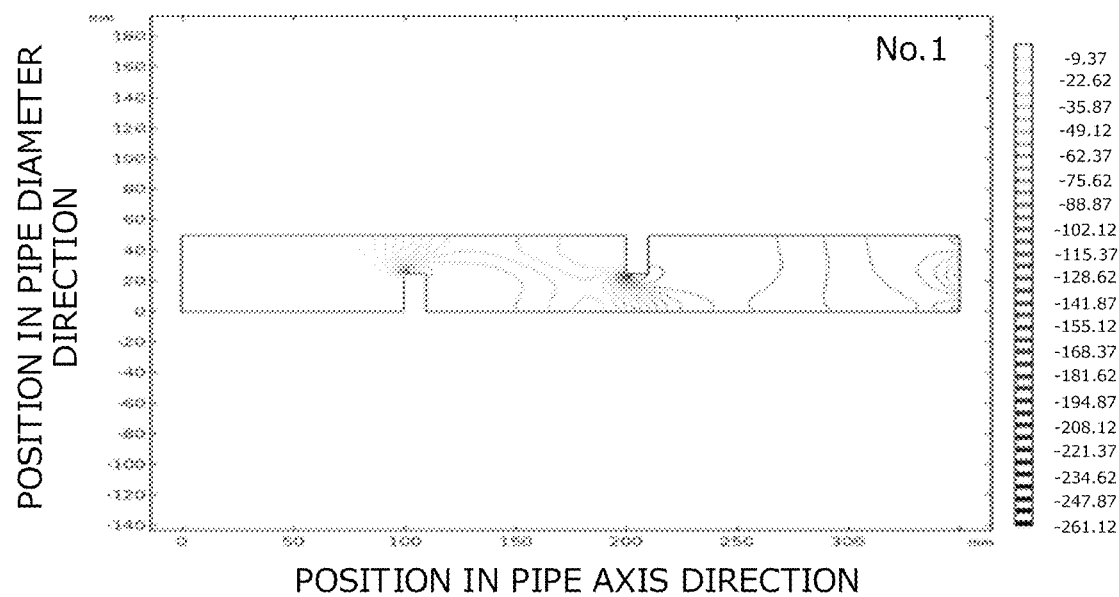
FIG. 10A is a graph diagram illustrating a state of pressure distribution inside the fine bubble generator.
Figure 10B:
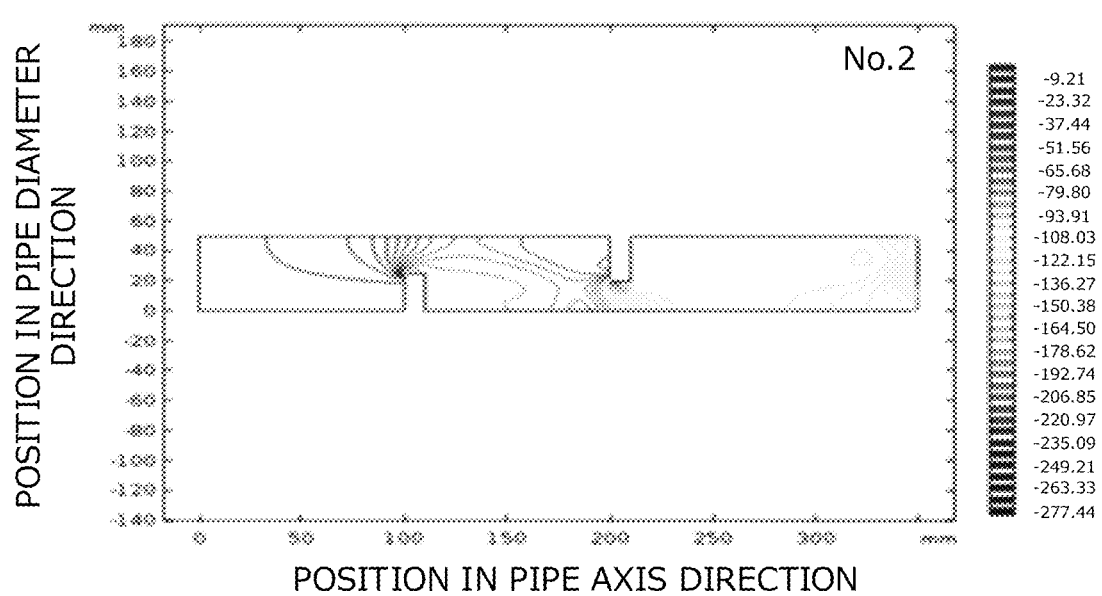
FIG. 10B is a graph diagram illustrating a state of pressure distribution inside the fine bubble generator.
Figure 10C:
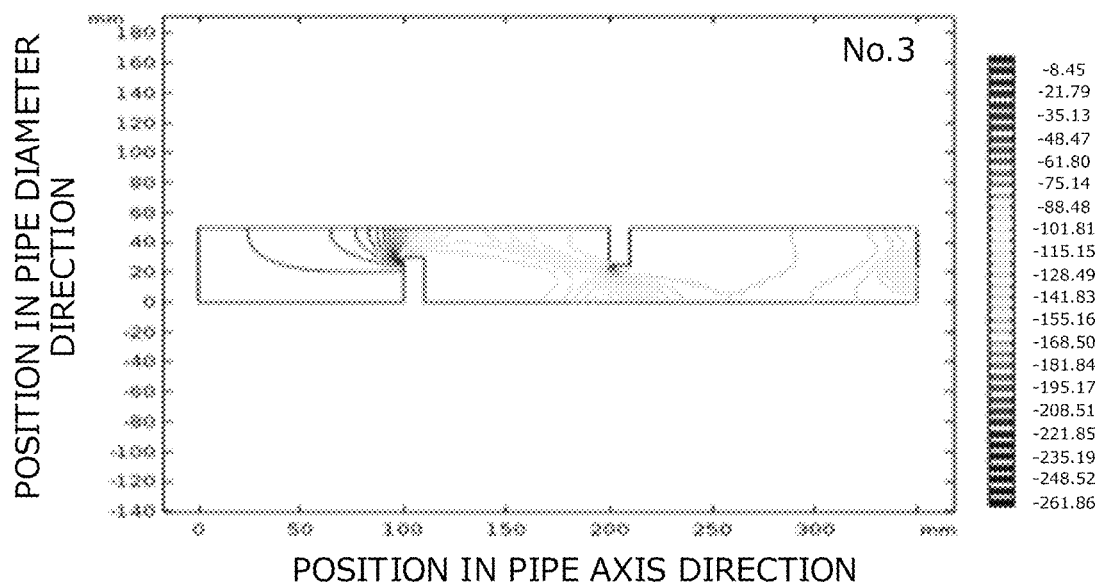
FIG. 10C is a graph diagram illustrating a state of pressure distribution inside the fine bubble generator.
Figure 10D:
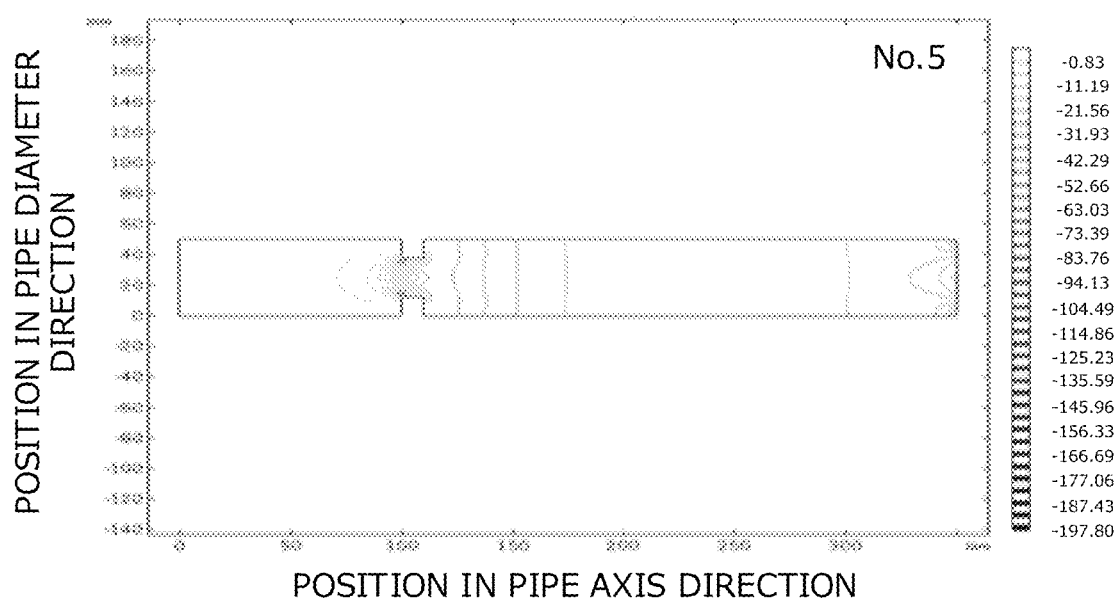
FIG. 10D is a graph diagram illustrating a state of pressure distribution inside the fine bubble generator.

Further, regarding the model indicated as No. 5 in FIG. 8 having a structure same as that of a venturi tube that exists conventionally, the result illustrated in FIG. 9E will be referred to. In this case, it can be confirmed that a pressure of the treatment liquid 3 flowed in the fine bubble generator 40 from the inlet side of the fine bubble generator 40 was reduced to $P_1$=about −65 Pa at the first narrow portion, and the pressure was then released to $P_1'$=about −35 Pa at the first non-narrow portion. Further, it can be confirmed from FIG. 8 that the particle diameter of the bubbles obtained at this time was 5.00 mm. Further, when focusing on the pressure distribution illustrated in FIG. 10C, also in the present model, a starting point of an isobar in FIG. 10D corresponds to an end point of the projecting member 401 positioned on the upstream side.

Regarding the five types of models illustrated in FIG. 8, the simulation results related to the pressure values at the respective narrow portions and non-narrow portions, and the particle diameters of the obtained fine bubbles are collectively shown in FIG. 11.

As described before, in the fine bubble generator 40 according to the present embodiment, it is preferable to generate fine bubbles having a fine bubble particle diameter (average bubble diameter) of 100 μm or less. It can be confirmed that the fine bubbles having an average bubble diameter of 100 µm or less can be generated in the models of No. 1, No. 2, and No. 3, but in the models of No. 4 and No. 5, it is not possible to generate fine bubbles having an average bubble diameter of 100 µm or less.

When comparing these results, it can be confirmed that in the model having the average bubble diameter of 100 µm or less, the pressure value at the second narrow portion is sufficiently smaller than the pressure value at the first narrow portion, but in the model having the average bubble diameter of greater than 100 µm, the pressure value at the second narrow portion is greater than the pressure value at the first narrow portion. Further, it can be confirmed that in the two or more pressure reduction-release cycles, it is preferable that both the pressure value at the first narrow portion and the pressure value at the second narrow portion become sufficiently small. It can be confirmed that this result can be realized by reducing the opening cross-sectional area ratio on the inlet side of the fine bubble generator 40.

Further, simulation results regarding the model indicated as No. 1 in FIG. 8 in which the inside diameter $D_0$ of the treatment liquid extraction pipe 33 was changed in four types of diameters of 25 mm, 50 mm, 100 mm, and 200 mm, while keeping the separation distance L unchanged to be 100 mm and keeping the flow velocity of the treatment liquid 3 unchanged to be 0.15 m/second, are illustrated in FIG. 12. Here, the inside diameter $D_0$ of the treatment liquid extraction pipe 33 can also be represented as $2 \times (A_0/\pi)^{0.5}$, by using the opening cross-sectional area $A_0$ of the inside diameter of the treatment liquid extraction pipe 33.

In FIG. 12, when focusing on a fine bubble particle diameter (average bubble diameter) by taking a relation of the separation distance L/the extraction pipe inside diameter $D_0$ on a horizontal axis, it can be confirmed that the fine bubble particle diameter becomes 100 µm or less within a range of $1.0 \leq L/D_0 \leq 5.0$. Further, it can be confirmed that at $L/D_0=2.0$ at which the pressure value $P_2$ at the second narrow portion becomes small, the fine bubble particle diameter is further reduced. Based on such a result, in a range of $L/D_0<1.0$, a sufficient pressure difference in the pressure reduction zones is not generated, and thus the fine bubbles cannot be generated. When the relation of $1.0 \leq L/D_0$ is satisfied, it is possible to realize the fine bubble particle diameter of 100 µm or less. The value of $L/D_0$ is preferably 1.5 or more, or 2.0 or more. When $1.5 \leq L/D_0$ or $2.0 \leq L/D_0$ is satisfied, the fine bubble particle diameter can be further reduced. On the other hand, even in a range of $5.0<L/D_0$, it is possible to generate fine bubbles having a particle diameter of 100 µm or less, but the pressure difference tends to be small, and a pipe length is required as the separation distance L is increased, which is not preferable from a viewpoint of restriction when installing the apparatus. The value of $L/D_0$ is preferably 4.5 or less, and more preferably 4.0 or less.

Note that in the simulation as described above, even if the inside diameter $D_0$ of the treatment liquid extraction pipe 33 is doubled, a result same as that of the above explanation can be obtained by doubling the separation distance L and quadrupling the flow velocity, and thus when compared to the case of the original inside diameter, the average bubble diameter and the bubble number density of fine bubbles are not changed.

Further, when a simulation same as the above-described one regarding a case where the number of narrow portions was set to two or more was separately performed, it was clarified that the reduction in both of a pressure value at a first narrow portion positioned closest to the treatment tank 10 side and a pressure value at a second narrow portion provided on a downstream side of the first narrow portion (provided so as to be adjacent to the first narrow portion) in two or more pressure reduction-release cycles, was effective for further micronizing fine bubbles.

In addition to the above, a ratio of an opening cross-sectional area positioned on a side close to the circulating pump 31 to an opening cross-sectional area on the inlet side of the fine bubble generator 40, is preferably set to 1.10 times or more.

Specifically, when the number of narrow portions is set to N, and an opening area ratio of an N-th narrow portion from the treatment tank 10 side toward the circulating pump 31 side is represented as $R_N$, it is preferable to satisfy the following formula (151) and formula (153).

$$R_{i+1} \geq R_i \quad \text{Formula (151)}$$

$$R_N/R_1 \geq 1.10 \quad \text{Formula (153)}$$

When both the above formula (151) and formula (153) are satisfied, it becomes possible to further reduce the pressure value at the narrow portion, the deaeration can be performed more easily, and further, it becomes possible to further reduce the fine bubble particle diameter. The value of $R_N/R_i$ is more preferably 1.25 or more.

Next, a flow velocity V of the treatment liquid 3 in the treatment liquid extraction pipe 33 and the fine bubble generator 40 will be studied. Here, when considering stable circulation of the treatment liquid 3, the flow velocity V is preferably at least 0.05 m/second or more. On the other hand, when the flow velocity V is set to a value of greater than 5 m/second, the circulating pump 31 becomes large in size, and the flow velocity V becomes excessively fast, resulting in that the fine bubble generator 40 may be damaged. Therefore, in the present embodiment, the flow velocity V of the treatment liquid 3 in the treatment liquid extraction pipe 33 and the fine bubble generator 40 is preferably set to 0.050 m/second or more and 5.000 m/second or less.

Here, a simulation result when the flow velocity of the treatment liquid 3 was changed to 0.075 m/second, 0.150 m/second, and 0.300 m/second regarding the model indicated as No. 1 in FIG. 8, is illustrated in FIG. 13. From FIG. 13, it can be confirmed that the faster the flow velocity V of the treatment liquid 3, the smaller the pressure value $P_2$ at the second narrow portion and the smaller the particle diameter (average bubble diameter) of generated fine bubbles.

Further, a bubble number density of the fine bubbles in the treatment liquid 3 can be adjusted to fall within a desired range by properly controlling treatment liquid capacity $[m^3]$/circulation flow rate (=flow velocity $[m/min] \times$(pipe inside diameter $D_0[m]/2)^2 \times \pi) \times$number of circulation path$\times$ time [min]). By setting the above range to 0.03 to 6.70, it is possible to more securely realize a proper bubble number density of fine bubbles. The above range is more preferably 0.05 to 6.00.

Although the contents described above focus attention on the various conditions in the treatment liquid extraction pipe 33 and the fine bubble generator 40 in the present embodiment, conditions in the treatment liquid 3 will be studied hereinbelow.

A relation between a dissolved gas concentration (%) in the treatment liquid 3 (water, for example) and a particle diameter (average bubble diameter) of fine bubbles that exist in the treatment liquid 3, is illustrated in FIG. 14. As is apparent from FIG. 14, it can be confirmed that the fine bubble particle diameter changes according to the dissolved gas concentration in the treatment liquid 3 (in other words, a deaeration state of the treatment liquid 3), and by controlling the dissolved gas concentration in the treatment liquid 3, it is possible to control the fine bubble particle diameter to a desired state. As is apparent from FIG. 14, it can be confirmed that in order to set the fine bubble particle diameter to 100 μm or less, it is preferable to set the dissolved gas concentration in the treatment liquid 3 to 50% or less.

Here, the dissolved gas concentration (specifically, a dissolved gas amount) in the treatment liquid 3 can be adjusted to a value within a desired range by changing the flow velocity V of the treatment liquid 3 or adjusting the opening cross-sectional area ratio ($A_i/A_0$). For example, by increasing an output of the circulating pump 31 to increase the flow velocity V of the treatment liquid 3, it is possible to increase a negative pressure to be generated, to thereby reduce the dissolved gas concentration. Further, by reducing the opening cross-sectional area ratio ($A_i/A_0$), it is possible to increase a negative pressure to be generated, to thereby reduce the dissolved gas concentration. At this time, the respective control conditions as described above may be adjusted so that the dissolved gas amount takes a value within the desired range, while measuring the dissolved gas amount by a publicly-known device as described above at a downstream side of the fine bubble generator 40 according to the present embodiment. Note that whether which of the flow velocity V of the treatment liquid 3 and the opening cross-sectional area ratio ($A_i/A_0$) is adjusted preferentially, is not limited in particular, and the control condition which is easily adjustable may be adjusted first. By adjusting the dissolved gas amount in the treatment liquid 3 by the method as described above, it is possible to set the average bubble diameter and the concentration (number density) of fine bubbles to be generated to values within the desired range.

The circulation path 30 and the fine bubble generator 40 according to the present embodiment have been described above in detail while referring to FIG. 2 to FIG. 14.

<Regarding Curved Member 50>

Returning to FIG. 1A and FIG. 1B again, the curved member 50 according to the present embodiment will be briefly described.

The curved member 50 is a member having a curved surface projecting toward a vibration surface of the ultrasonic generator 20, and is a member which reflects ultrasonic waves that reach the curbed member 50, in multiple directions. By providing the curved member 50 to at least either of a wall surface and a bottom surface in the treatment tank 10, it becomes possible to propagate ultrasonic waves generated from the vibration surface of the ultrasonic generator 20 to the entire treatment tank 10. Note that the curved member 50 may be provided according to need, and the curved member 50 may not exist in the ultrasonic treatment apparatus 1 according to the present embodiment.

More specifically, the curved member 50 according to the present embodiment has a projecting curved surface in which at least a projecting bent portion with a surface shape of a spherical surface or an aspherical surface exists, and the projecting bent portion is in a state of further projecting toward the vibration surface side of the ultrasonic generator 20, relative to a portion other than the projecting bent portion. Further, the curved member 50 according to the present embodiment may also have a non-projecting bent portion being a portion that is not the projecting bent portion, or it may also be composed only of the projecting curved surface. Besides, the curved member 50 according to the present embodiment may be a solid columnar body or a hollow cylindrical body. Further, when the curved member 50 is hollow, various types of gases such as air may exist in a gap of the curved member 50 in a state of being installed to the treatment tank 10, or various types of liquids such as the treatment liquid 3 contained in the treatment tank 10 may exist in the gap.

When the curved member 50 has the projecting curved surface as described above, ultrasonic waves are reflected in multiple directions, and a uniform ultrasonic propagation with no polarization is realized, resulting in that the interference among ultrasonic waves can be suppressed. Here, when the curved member 50 includes a recessed portion, ultrasonic waves are reflected at the recessed portion to be focused, resulting in that the ultrasonic waves cannot be effectively reflected to the entire treatment tank 10. Further, even in a case of including a projecting portion, if the projecting portion is not a curved surface but a flat surface, it is possible to reflect ultrasonic waves only in one direction, and thus the ultrasonic waves cannot be effectively reflected to the entire treatment tank 10.

The curved member 50 having the shape as described above is preferably formed by using a material that reflects ultrasonic waves. As such a material, there can be cited, for example, a material having an acoustic impedance (specific acoustic impedance) of $1 \times 10^7$ [$kg \cdot m^{-2} \cdot sec^{-1}$] or more and $2 \times 10^8$ [$kg \cdot m^{-2} \cdot sec^{-1}$] or less. By using the material whose acoustic impedance is $1 \times 10^7$ [$kg \cdot m^{-2} \cdot sec^{-1}$] or more and $2 \times 10^8$ [$kg \cdot m^{-2} \cdot sec^{-1}$] or less, it becomes possible to efficiently reflect ultrasonic waves.

Examples of the material having the acoustic impedance of $1 \times 10^7$ [$kg \cdot m^{-2} \cdot sec^{-1}$] or more and $2 \times 10^8$ [$kg \cdot m^{-2} \cdot sec^{-1}$] or less include various types of metals or metal oxides and various types of ceramics including non-oxide ceramic, for example. Concrete examples of such materials include, for example, steel (specific acoustic impedance [$kg \cdot m^{-2} \cdot sec^{-1}$]: $4.70 \times 10^7$, hereinafter, a numeric value in parentheses represents a value of the specific acoustic impedance as well), iron ($3.97 \times 10^7$), stainless steel (SUS, $3.97 \times 10^7$), titanium ($2.73 \times 10^7$), zinc ($3.00 \times 10^7$), nickel ($5.35 \times 10^7$), aluminum ($1.38 \times 10^7$), tungsten ($1.03 \times 10^8$), glass ($1.32 \times 10^7$), quartz glass ($1.27 \times 10^7$), glass lining ($1.67 \times 10^7$), alumina (aluminum oxide, $3.84 \times 10^7$), zirconia (zirconium oxide, $3.91 \times 10^7$), silicon nitride (SiN, $3.15 \times 10^7$), silicon carbide (SiC, $3.92 \times 10^7$), tungsten carbide (WC, $9.18 \times 10^7$), and so on. In the curved member 50 according to the present embodiment, the material used for forming the curved member 50 may be appropriately selected according to liquid properties of the treatment liquid 3 to be contained in the treatment tank 10, strength required for the curved member 50, and so on, but it is preferable to use various types of metals or metal oxides having the acoustic impedance as described above.

The curved member 50 according to the present embodiment has been described above briefly.

The overall configuration of the ultrasonic treatment apparatus 1 according to the present embodiment has been described above in detail while referring to FIG. 1A to FIG. 14.

Note that in the above explanation, the case is cited as an example in which the object to be treated immersed in the treatment liquid 3 is provided inside the treatment tank 10 provided as the treatment part, and then the ultrasonic waves are indirectly applied to the object to be treated via the treatment liquid 3 contained in the treatment tank 10, but the ultrasonic generator 20 may directly apply the ultrasonic waves to the object to be treated filled with the treatment liquid in the treatment part.

For example, a hollow member itself in a state where its inner part is filled with a liquid, such as a pipe provided inside a heat exchanger or a connection pipe connecting between a plurality of facilities using a liquid, may also be set to the object to be treated. In such a case, fine bubbles are generated with respect to the liquid contained inside the hollow member, and then ultrasonic waves are applied to the hollow member itself.

EXAMPLES

Next, the ultrasonic treatment apparatus and the ultrasonic treatment method according to the present invention will be concretely described while showing examples and comparative examples. Note that the examples shown below are only examples of the ultrasonic treatment apparatus and the ultrasonic treatment method according to the present invention, and the ultrasonic treatment apparatus and the ultrasonic treatment method according to the present invention are not limited to the examples shown below.

Experimental Example 1

Figure 15:
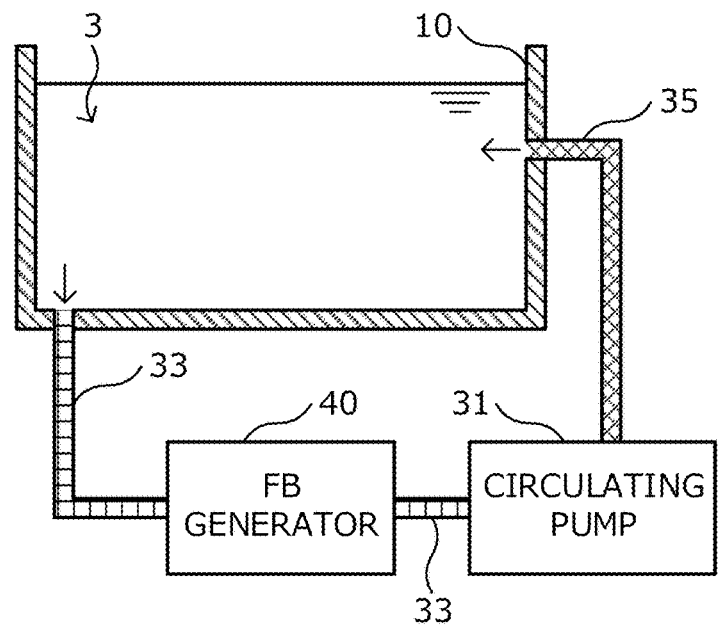
FIG. 15 is an explanatory diagram schematically illustrating a configuration of an apparatus used in an experimental example 1.

FIG. 15 is a diagram of an apparatus used for verifying a relation between various types of fine bubble generators and a dissolved gas amount. In the present experimental example, purified water was used as the treatment liquid 3. As the treatment tank 10, one having an outer wall made of SUS, having a size of width of 0.5 m×length of 0.5 m×0.4 m, and having a capacity of 0.1 m$^3$ was used. Further, to such a treatment tank 10, the circulation path 30 having the circulating pump 31, the treatment liquid extraction pipe 33, and the treatment liquid discharge pipe 35 was provided. As the circulating pump 31, MD-40RZ, MD-70RZ, and MD-100R manufactured by IWAKI CO., LTD., each being a general-purpose pump, were used. The pipe inside diameter $D_0$ of the treatment liquid extraction pipe 33 was set to 20 mm. Accordingly, a negative pressure environment in the treatment liquid extraction pipe 33 was in a range of −0.05 MPa to −0.10 MPa.

Figure 16:
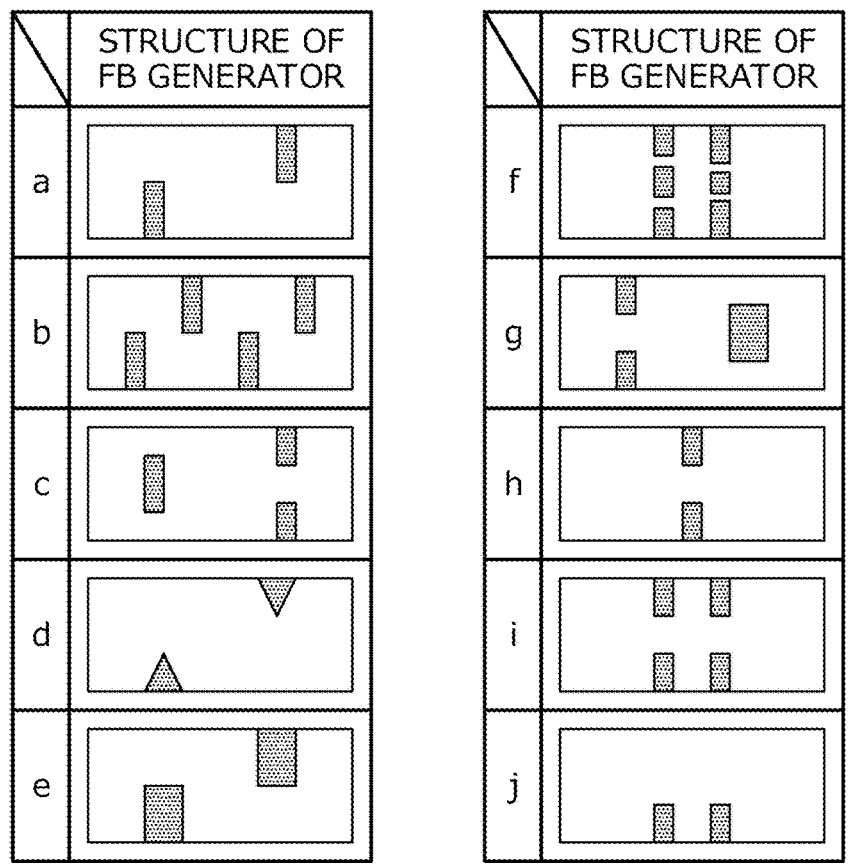
FIG. 16 is an explanatory diagram schematically illustrating configurations of fine bubble generators used in the experimental example 1.

Further, the fine bubble generators 40 having structures as illustrated in FIG. 16 were respectively prepared as jigs capable of being attached/detached to/from the treatment liquid extraction pipe 33, and these jigs were set to be able to be connected in series with the treatment liquid extraction pipe 33. In the structures a, b, and e in FIG. 16, opening flow paths of narrow portions are not overlapped in a pipe axis direction as illustrated in FIG. 2, and in the structure d, opening flow paths of narrow portions are not overlapped in a pipe axis direction as illustrated in FIG. 3. Further, in the structures c and g, shapes are different at two cross sections in a pipe axis direction, but opening flow paths of narrow portions are not overlapped in the same manner. The structure f was set to one in which opening flow paths of a part of narrow portions were overlapped as illustrated in FIG. 4. Note that in the fine bubble generator 40 in which a plurality of narrow portions were continuously provided, the separation distances L were set to 10 mm, 20 mm, 50 mm, 100 mm, and 120 mm. Besides, a flowmeter was attached to the treatment liquid extraction pipe 33, to measure a flow rate of the treatment liquid extraction pipe 33. A flow velocity (m/s) of the treatment liquid 3 was calculated by dividing a measured value of the obtained flow rate by a cross-sectional area of the pipe inside diameter.

Besides, regarding a pressure change between pressure reduction-release cycles in each of the fine bubble generators 40, COMSOL Multiphysics being commercially available fluid analysis software was used to calculate a pressure difference between a pressure reduction zone and a release zone when the treatment liquid 3 flowed at a flow velocity of 0.15 m/second.

An average bubble diameter of fine bubbles was specified by measuring a solution in the treatment tank 10 by using a precision particle size distribution measuring device Multisizer 4 manufactured by Beckman Coulter, Inc., and a nanoparticle analyzer NanoSight LM10 manufactured by Malvern. Further, for measurement of a dissolved gas amount, a dissolved oxygen meter LAQUA OM-51 manufactured by HORIBA, Ltd. was used to measure a dissolved oxygen amount (DO) every minute as a value in proportion to the dissolved gas amount, to thereby make an estimate of the dissolved gas amount with respect to a saturated dissolved amount (%). More specifically, the dissolved oxygen amount DO was measured every minute to calculate a difference ADO with respect to the dissolved oxygen amount at the last measurement. At a point of time when each value of ADO became less than 0.1 during continuous three minutes, the dissolved oxygen amount was judged to reach a lower limit, and a comparison of the dissolved oxygen amount and the average bubble diameter at the point of time was performed.

TABLE 1

| | FINE BUBBLE GENERATOR | | | | | |
|---|---|---|---|---|---|---|
| | NUMBER OF NARROW PORTION | SHAPE OF NARROW PORTION | PRESENCE/ ABSENCE OF OVERLAP OF NARROW PORTION OPENING FLOW PATHS | NARROW PORTION OPENING CROSS-SECTIONAL AREA RATIO $R_i = (A_i/A_0)$ | OPENING CROSS-SECTIONAL AREA RATIO $R_N/R_1$ | NARROW PORTION INTERVAL $L/D_0$ |
| EXAMPLE 1 | 2 | a | ABSENCE | 0.10-0.10 | 1.00 | 5.0 |
| EXAMPLE 2 | 2 | a | ABSENCE | 0.20-0.20 | 1.00 | 5.0 |
| EXAMPLE 3 | 2 | a | ABSENCE | 0.40-0.50 | 0.80 | 5.0 |
| EXAMPLE 4 | 2 | a | ABSENCE | 0.40-0.40 | 1.00 | 5.0 |
| EXAMPLE 5 | 2 | a | ABSENCE | 0.40-0.40 | 1.00 | 1.0 |
| EXAMPLE 6 | 2 | a | ABSENCE | 0.40-0.40 | 1.00 | 2.5 |
| EXAMPLE 7 | 4 | b | ABSENCE | 0.50 × 4 | 1.00 | 1.0 |
| EXAMPLE 8 | 8 | b × 2 CYCLES | ABSENCE | 0.50 × 8 | 1.00 | 1.0 |
| EXAMPLE 9 | 10 | b × 2.5 CYCLES | ABSENCE | 0.50 × 10 | 1.00 | 1.0 |

TABLE 1-continued

| | | | | | | |
|---|---|---|---|---|---|---|
| EXAMPLE 10 | 2 | c | ABSENCE | 0.40-0.40 | 1.00 | 5.0 |
| EXAMPLE 11 | 2 | d | ABSENCE | 0.40-0.40 | 1.00 | 5.0 |
| EXAMPLE 12 | 2 | e | ABSENCE | 0.40-0.40 | 1.00 | 5.0 |
| EXAMPLE 13 | 2 | f | PRESENCE | 0.40-0.40 | 1.00 | 5.0 |
| EXAMPLE 14 | 2 | g | ABSENCE | 0.40-0.40 | 1.00 | 5.0 |
| EXAMPLE 15 | 2 | a | ABSENCE | 0.40-0.30 | 1.30 | 5.0 |
| EXAMPLE 16 | 2 | a | ABSENCE | 0.40-0.20 | 2.00 | 5.0 |
| EXAMPLE 17 | 4 | b | ABSENCE | 0.50-0.40-0.30-0.20 | 2.50 | 1.0 |
| EXAMPLE 18 | 4 | b | ABSENCE | 0.50-0.50-0.30-0.30 | 1.67 | 1.0 |
| COMPARATIVE EXAMPLE 1 | 1 | h | — | 0.50 | — | 5.0 |
| COMPARATIVE EXAMPLE 2 | 2 | i | PRESENCE | 0.50-0.50 | 1.00 | 5.0 |
| COMPARATIVE EXAMPLE 3 | 2 | j | PRESENCE | 0.50-0.50 | 1.00 | 5.0 |
| COMPARATIVE EXAMPLE 4 | 2 | a | ABSENCE | 0.50-0.50 | 1.00 | 0.5 |
| COMPARATIVE EXAMPLE 5 | 2 | a | ABSENCE | 0.10-0.10 | 1.00 | 6.0 |
| COMPARATIVE EXAMPLE 6 | 2 | a | PRESENCE | 0.80-0.80 | 1.00 | 5.0 |
| COMPARATIVE EXAMPLE 7 | 2 | a | PRESENCE | 0.60-0.60 | 1.00 | 5.0 |
| COMPARATIVE EXAMPLE 8 | 2 | a | ABSENCE | 0.09-0.09 | 1.00 | 5.0 |
| COMPARATIVE EXAMPLE 9 | 2 | a | ABSENCE | 0.05-0.05 | 1.00 | 5.0 |

| | FINE BUBBLE GENERATOR FLOW PATH DIRECTION BENT/STRAIGHT | MEASUREMENT ITEM | | | | DISSOLVED GAS |
|---|---|---|---|---|---|---|
| | | FLOW VELOCITY m/s | PRESSURE DIFFERENCE BETWEEN NARROW PORTIONS Δ maxkPa | FINE BUBBLE AVERAGE BUBBLE DIAMETER μm | FINE BUBBLE BUBBLE NUMBER DENSITY PIECE/mL | AMOUNT RATIO TO SATURATED AMOUNT % |
| EXAMPLE 1 | BENT | 0.21 | −0.14 | 14 | 25300 | 45 |
| EXAMPLE 2 | BENT | 1.00 | −0.14 | 11 | 12000 | 25 |
| EXAMPLE 3 | BENT | 1.47 | −0.11 | 78 | 8800 | 59 |
| EXAMPLE 4 | BENT | 1.26 | −0.12 | 35 | 6000 | 40 |
| EXAMPLE 5 | BENT | 0.65 | −0.15 | 15 | 30000 | 34 |
| EXAMPLE 6 | BENT | 1.24 | −0.16 | 13 | 64300 | 23 |
| EXAMPLE 7 | BENT | 1.23 | −0.13 | 10 | 28000 | 25 |
| EXAMPLE 8 | BENT | 1.20 | −0.14 | 8 | 35800 | 35 |
| EXAMPLE 9 | BENT | 1.20 | −0.14 | 7 | 45000 | 42 |
| EXAMPLE 10 | BENT | 1.23 | −0.12 | 15 | 9600 | 30 |
| EXAMPLE 11 | BENT | 1.22 | −0.11 | 28 | 8500 | 40 |
| EXAMPLE 12 | BENT | 1.23 | −0.11 | 45 | 5500 | 35 |
| EXAMPLE 13 | BENT | 1.24 | −0.10 | 37 | 6100 | 45 |
| EXAMPLE 14 | BENT | 1.22 | −0.11 | 40 | 5800 | 40 |
| EXAMPLE 15 | BENT | 1.22 | −0.15 | 5 | 221100 | 30 |
| EXAMPLE 16 | BENT | 0.87 | −0.16 | 4 | 550000 | 25 |
| EXAMPLE 17 | BENT | 1.10 | −0.17 | 2 | 825000 | 15 |
| EXAMPLE 18 | BENT | 1.23 | −0.16 | 3 | 683000 | 19 |
| COMPARATIVE EXAMPLE 1 | — | 1.33 | −0.02 | 5100 | 350 | 70 |
| COMPARATIVE EXAMPLE 2 | STRAIGHT | 1.28 | −0.04 | 2300 | 480 | 65 |
| COMPARATIVE EXAMPLE 3 | STRAIGHT | 1.30 | −0.08 | 260 | 770 | 58 |
| COMPARATIVE EXAMPLE 4 | BENT | 1.19 | −0.01 | 4000 | 200 | 80 |
| COMPARATIVE EXAMPLE 5 | BENT | 0.10 | −0.06 | 115 | 850 | 55 |
| COMPARATIVE EXAMPLE 6 | BENT | 2.00 | 0 | — | 0 | 99 |
| COMPARATIVE EXAMPLE 7 | BENT | 1.60 | −0.01 | 700 | 300 | 90 |
| COMPARATIVE EXAMPLE 8 | BENT | 0.04 | — | 122 | 230 | 97 |
| COMPARATIVE EXAMPLE 9 | BENT | UNMEASURABLE | — | UNMEASURABLE | UNMEASURABLE | UNMEASURABLE |

The obtained results are collectively shown in the above Table 1. Note that in the column of "narrow portion opening cross-sectional area ratio" in the above Table 1, a value of a narrow portion opening cross-sectional area ratio $R_N$ is indicated at the most left side position in the column, a value of a narrow portion opening cross-sectional area ratio $R_1$ is indicated at the most right side position in the column, and when there are a multiple stages of narrow portions having the same value of the narrow portion opening cross-sectional area ratio, the description is simplified as "0.50×4", for example. Further, under the condition where there are a multiple stages of narrow portions, a value obtained from a combination that gives the maximum opening cross-sectional area ratio is set to $R_N/R_1$.

First, when referring to comparative examples, in a comparative example 1 in which there was no pressure reduction-release cycle and the flow path was simply narrowed, although it was possible to reduce the dissolved gas amount, the average bubble diameter did not become a diameter of fine bubble, and was unchanged to be large. Comparative examples 2 and 3 in each of which the pressure reduction-release cycles were provided and the flow path was provided straight, were almost the same as the comparative example 1, and the average bubble diameter was large. Further, in a comparative example 4 in which the separation distance ratio $L/D_0$ was less than 1.0 and in a comparative example 5 in which the separation distance ratio $L/D_0$ was greater than 5.0, the average bubble diameter did not become 100 m or less capable of being regarded as a fine bubble. Further, in comparative examples 6 and 7 in each of which the narrow portion opening cross-sectional area ratio was greater than 0.50, the pressure was not reduced, and bubbles were not generated almost at all. In comparative examples 8 and 9 in each of which the narrow portion opening cross-sectional area ratio was less than 0.10, there existed almost no liquid capable of being circulated, and thus bubbles were not generated or the circulating pump ran idle, resulting in that the liquid feeding itself could not be performed.

On the other hand, in examples 1 to 7 in each of which two or more pressure reduction-release cycles were provided, and the separation distance ratio of the narrow portions provided to prevent the opening flow path from proceeding straight fell in the predetermined range, in examples 8 and 9 in each of which the number of pressure reduction-release cycles was increased, and in examples 10 to 14 in each of which the shape of the narrow portions was changed, the average bubble diameter became 100 μm or less capable being regarded as a fine bubble. At the same time, the dissolved gas amount was observed to be lowered. In particular, in examples 15 to 18 each satisfying the relation of $R_N/R_1 \geq 1.10$ by narrowing the narrow portion in the pressure reduction-release cycle on the side close to the pump, the pressure difference between the pressure reduction and the release became large, and it was observed that the dissolved gas was reduced and fine bubbles were micronized up to several μm or less to increase the bubble number density.

Experimental Example 2

Figure 17A:
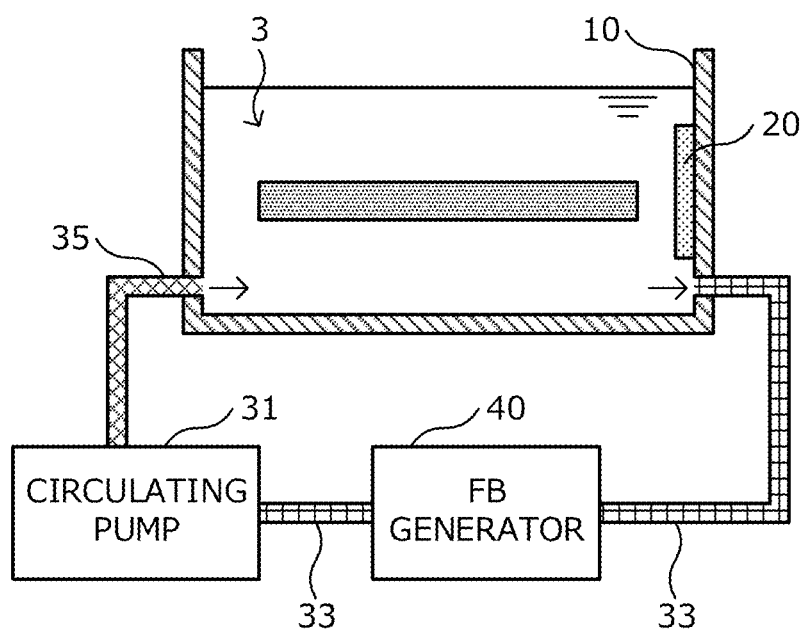
FIG. 17A is an explanatory diagram schematically illustrating a configuration of an ultrasonic treatment apparatus used in an experimental example 2.
Figure 17B:
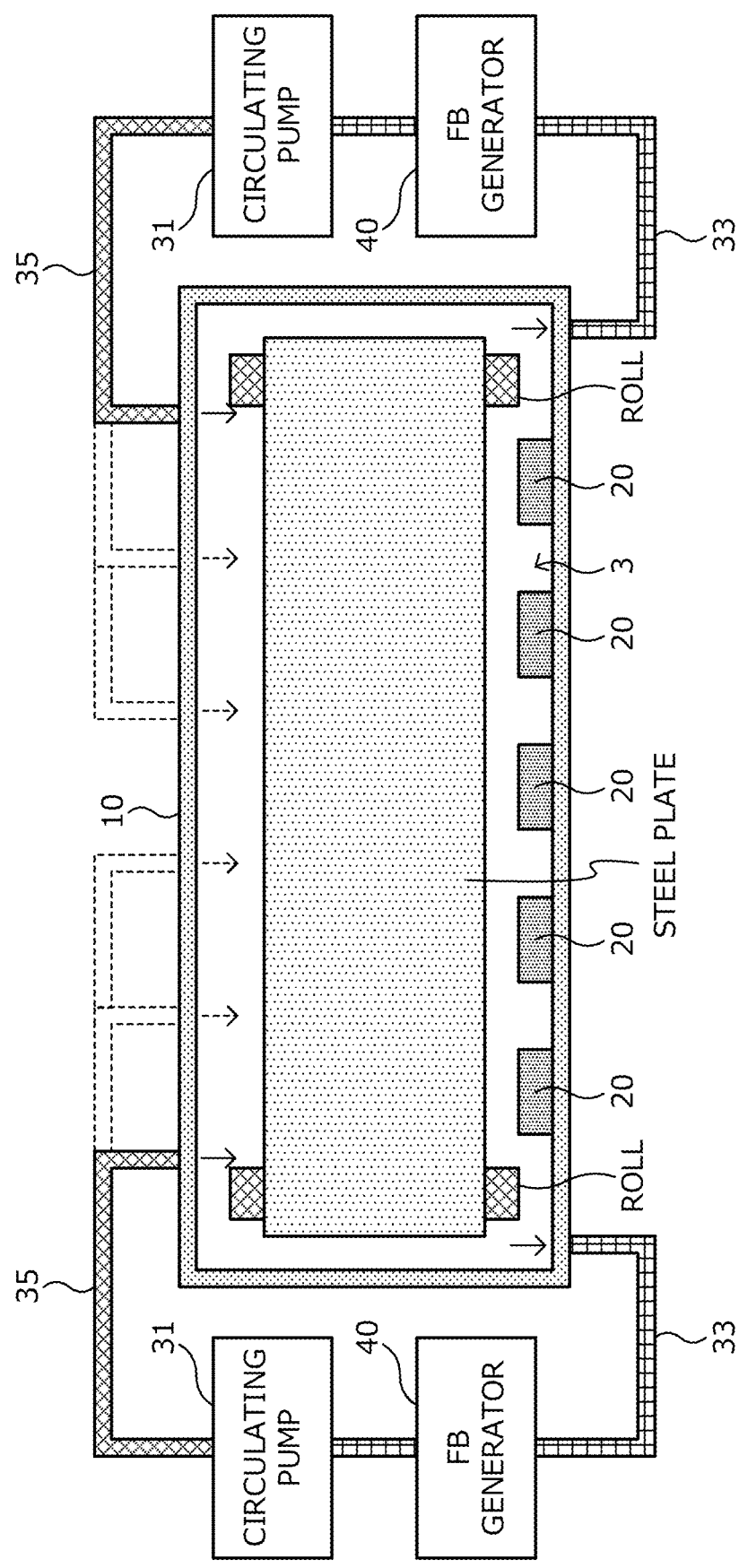
FIG. 17B is an explanatory diagram schematically illustrating a configuration of the ultrasonic treatment apparatus used in the experimental example 2.

FIG. 17A and FIG. 17B are explanatory diagrams schematically illustrating a state of executing water washing (rinsing) treatment of a steel plate by using the ultrasonic treatment apparatus according to the present invention. As a rinse solution being the treatment liquid 3, purified water was used. As the treatment tank 10, one having an outer wall made of SUS, having a size of width of 2.0 m×length of 7 m×0.5 m, and having a capacity of 7 m³ was used, and the steel plate being an object to be treated was set to be held by rolls.

Further, to such a treatment tank 10, two systems of the circulation path 30 having the circulating pump 31, the treatment liquid extraction pipe 33, and the treatment liquid discharge pipe 35 were provided, as illustrated in FIG. 17B. As the circulating pumps 31, two pumps of MEP-0505-2P manufactured by Seikow Chemical Engineering & Machinery, Ltd., being general-purpose pumps, were used. The pipe inside diameter $D_0$ of the treatment liquid extraction pipe 33 was set to 50 mm. Accordingly, a negative pressure environment in the treatment liquid extraction pipe 33 was in a range of −0.05 MPa to −0.10 MPa.

Further, according to the description illustrated in FIG. 16, the fine bubble generators 40 having structures as shown in the following Table 2 were respectively prepared as jigs capable of being attached/detached to/from the treatment liquid extraction pipe 33, and these jigs were set to be able to be connected in series with the treatment liquid extraction pipe 33. Note that in the fine bubble generator 40 in which a plurality of narrow portions were continuously provided, the separation distances L were set to 20 mm, 40 mm, 100 mm, 200 mm, and 300 mm. Besides, a flowmeter was attached to the treatment liquid extraction pipe 33, to measure a flow rate of the treatment liquid extraction pipe 33, and the flow velocity of the treatment liquid 3 was controlled to fall within the above-described preferable range.

Further, an output of an ultrasonic oscillator of the ultrasonic generator 20 was 1200 W, and a frequency of ultrasonic waves was set to 35 kHz. As illustrated in FIG. 17B, five immersion transducers made of SUS were disposed to a one-side wall surface of a long edge of the treatment tank 10, to thereby apply ultrasonic waves to the treatment liquid 3.

An average bubble diameter of fine bubbles was specified by measuring a solution in the treatment tank 10 by using a precision particle size distribution measuring device Multisizer 4 manufactured by Beckman Coulter, Inc., and a nanoparticle analyzer NanoSight LM10 manufactured by Malvern. Further, for measurement of a dissolved gas amount, a dissolved oxygen meter LAQUA OM-51 manufactured by HORIBA, Ltd. was used to measure a dissolved oxygen amount (DO) every minute as a value in proportion to the dissolved gas amount, to thereby make an estimate of the dissolved gas amount with respect to a saturated dissolved amount (%). More specifically, the dissolved oxygen amount DO was measured every minute to calculate a difference ADO with respect to the dissolved oxygen amount at the last measurement. At a point of time when each value of ADO became less than 0.1 during continuous three minutes, the dissolved oxygen amount was judged to reach a lower limit, and a comparison of the dissolved oxygen amount and the average bubble diameter at the point of time was performed.

Figure 18:
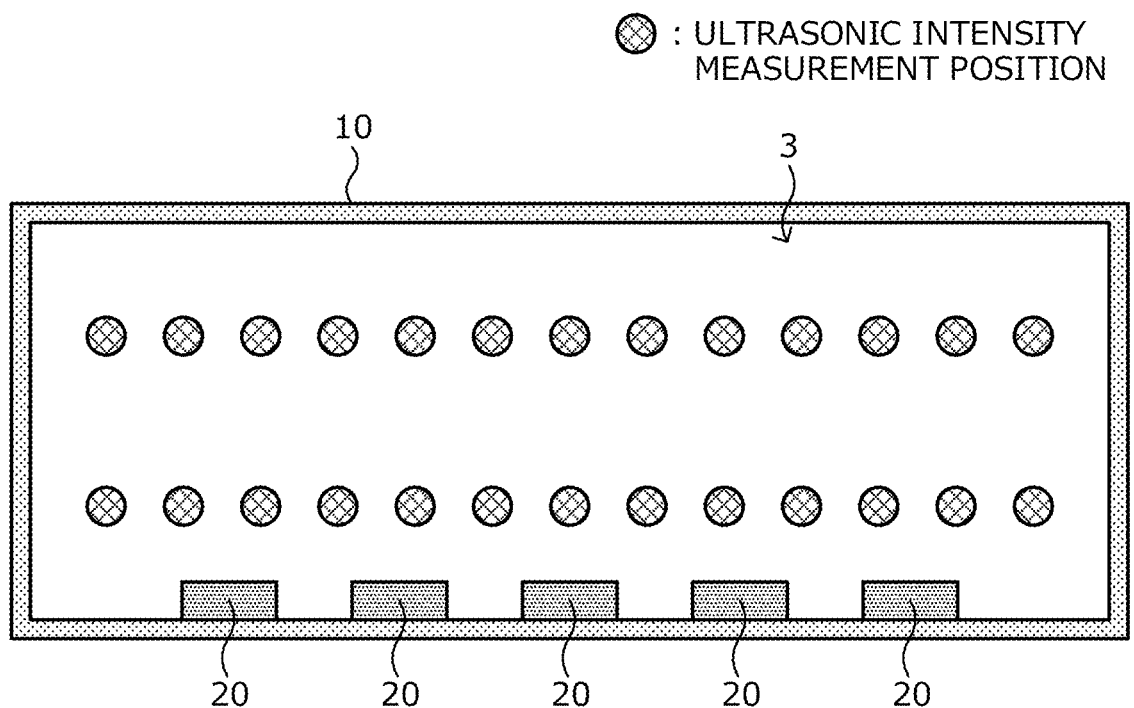
FIG. 18 is an explanatory diagram for explaining measurement positions of ultrasonic intensities.

As schematically illustrated in FIG. 18, in the present experimental example, an ultrasonic level monitor (19001D manufactured by Kaijo Corporation) was used to perform measurement of ultrasonic intensities (mV) at 26 locations in total at 0.5 m interval, and relative ultrasonic intensity (relative intensity when a measurement result of a comparative example 1, namely, measured ultrasonic intensity in a case where the pressure reduction-release cycle was not provided was set to 1) and a standard deviation (a) were calculated to compare the ultrasonic propagation property in the entire treatment tank 10.

In the present experimental example, a steel plate formed with an oxide scale film, after being subjected to pickling, was prepared as an object to be treated, and by using the treatment tank 10 as described above, water washing (rinsing) of the steel plate having oxide fine particles adhered to a surface thereof was conducted.

In the present experimental example, an oxide fine particle removal ratio on the surface of the steel plate was measured, and the measured oxide fine particle removal ratio was evaluated as a cleaning performance. More specifically, a ratio of an oxide fine particle removal amount capable of being removed under respective conditions to a total amount of oxide fine particles adhered to the surface of the steel plate before and after the water washing, was calculated as follows, and the ratio was set to the oxide fine particle removal ratio.

Specifically, a steel plate sample (having a size of 5 cm×10 cm) formed with an oxide scale film was attached to a steel plate held by rolls, and then the cleaning performance was evaluated. After the steel plate sample was subjected to pickling, it was subjected to preliminary water washing and drying. After that, two general-purpose adhesive cellophane tapes (width of 15 mm×length of 5 cm) whose mass was measured beforehand, were used to peel off the oxide fine particles adhered to the surface of the steel plate, from two locations, to thereby obtain measured values of tape mass before water washing. Further, tape peeling was conducted as well in a similar manner after the water washing, at locations different from those at which the peeling was performed before the water washing, and the tape mass after performing the peeling was measured.

A value obtained by subtracting the tape mass measured beforehand from the tape measured value before the water washing corresponds to the total amount of the oxide fine particles, and a value obtained by subtracting the tape mass measured beforehand from the tape measured value after the water washing corresponds to a remaining amount of the oxide fine particles. Accordingly, a value obtained by subtracting the remaining amount of the oxide fine particles from the total amount of the oxide fine particles corresponds to a removal amount of the oxide fine particles. A ratio of the removal amount of the oxide fine particles capable of being removed under respective conditions to the total amount of the oxide fine particles was set to an oxide fine particle removal ratio. Note that the steel plate sample was attached between rolls, and after it was detached therefrom, calculation was performed as a removal ratio at a plate passage speed of 100 mpm.

Note that evaluation criteria for the cleaning performance in Table 2 below are as follows.
Oxide fine particle removal ratio
AA: 100% or less to 95% or more
A: less than 95% to 90% or more
AB: less than 90% to 85% or more
B: less than 85% to 80% or more
C: less than 80% to 60% or more
D: less than 60% to 40% or more
E: less than 40%

Specifically, the evaluations "AA" and "A" mean that the cleaning performance was very good, the evaluations "AB" and "B" mean that the cleaning performance was good, the evaluation "C" means that the cleaning performance had a little problem, and evaluations "D" and "E" mean that the cleaning performance was poor.

TABLE 2

| | FINE BUBBLE GENERATOR | | | | | | |
|---|---|---|---|---|---|---|---|
| | NUMBER OF NARROW PORTION | SHAPE OF NARROW PORTION | PRESENCE/ ABSENCE OF OVERLAP OF NARROW PORTION OPENING FLOW PATHS | NARROW PORTION OPENING CROSS-SECTIONAL AREA RATIO $R_i = (A_i/A_0)$ | OPENING CROSS-SECTIONAL AREA RATIO $R_N/R_1$ | NARROW PORTION INTERVAL $L/D_0$ | FLOW PATH DIRECTION BENT/ STRAIGHT |
| EXAMPLE 1 | 2 | a | ABSENCE | 0.10-0.10 | 1.00 | 4.0 | BENT |
| EXAMPLE 2 | 2 | a | ABSENCE | 0.20-0.20 | 1.00 | 4.0 | BENT |
| EXAMPLE 3 | 2 | a | ABSENCE | 0.40-0.50 | 0.80 | 4.0 | BENT |
| EXAMPLE 4 | 2 | a | ABSENCE | 0.40-0.40 | 1.00 | 4.0 | BENT |
| EXAMPLE 5 | 2 | a | ABSENCE | 0.40-0.40 | 1.00 | 1.0 | BENT |
| EXAMPLE 6 | 2 | a | ABSENCE | 0.40-0.40 | 1.00 | 2.0 | BENT |
| EXAMPLE 7 | 4 | b | ABSENCE | 0.50 × 4 | 1.00 | 1.0 | BENT |
| EXAMPLE 8 | 8 | b × 2 CYCLES | ABSENCE | 0.50 × 8 | 1.00 | 1.0 | BENT |
| EXAMPLE 9 | 10 | b × 2.5 CYCLES | ABSENCE | 0.50 × 10 | 1.00 | 1.0 | BENT |
| EXAMPLE 10 | 2 | c | ABSENCE | 0.40-0.40 | 1.00 | 4.0 | BENT |
| EXAMPLE 11 | 2 | d | ABSENCE | 0.40-0.40 | 1.00 | 4.0 | BENT |
| EXAMPLE 12 | 2 | e | ABSENCE | 0.40-0.40 | 1.00 | 4.0 | BENT |
| EXAMPLE 13 | 2 | f | PRESENCE | 0.40-0.40 | 1.00 | 4.0 | BENT |
| EXAMPLE 14 | 2 | g | ABSENCE | 0.40-0.40 | 1.00 | 4.0 | BENT |
| EXAMPLE 15 | 2 | a | ABSENCE | 0.40-0.30 | 1.33 | 4.0 | BENT |
| EXAMPLE 16 | 2 | a | ABSENCE | 0.40-0.20 | 2.00 | 4.0 | BENT |
| EXAMPLE 17 | 4 | b | ABSENCE | 0.50-0.40-0.30-0.20 | 2.50 | 1.0 | BENT |
| EXAMPLE 18 | 4 | b | ABSENCE | 0.50-0.50-0.30-0.30 | 1.67 | 1.0 | BENT |
| COMPARATIVE EXAMPLE 1 | — | — | — | 1.00 | — | 4.0 | — |
| COMPARATIVE EXAMPLE 2 | 1 | h | — | 0.50 | — | 4.0 | — |
| COMPARATIVE EXAMPLE 3 | 1 | h | — | 0.30 | — | 4.0 | — |
| COMPARATIVE EXAMPLE 4 | 2 | i | PRESENCE | 0.50-0.50 | 1.00 | 4.0 | STRAIGHT |

TABLE 2-continued

| | | | | | | | |
|---|---|---|---|---|---|---|---|
| COMPARATIVE EXAMPLE 5 | 2 | j | PRESENCE | 0.50-0.50 | 1.00 | 4.0 | STRAIGHT |
| COMPARATIVE EXAMPLE 6 | 2 | a | ABSENCE | 0.50-0.50 | 1.00 | 0.5 | BENT |
| COMPARATIVE EXAMPLE 7 | 2 | a | ABSENCE | 0.50-0.50 | 1.00 | 0.8 | BENT |
| COMPARATIVE EXAMPLE 8 | 2 | a | ABSENCE | 0.50-0.50 | 1.00 | 6.0 | BENT |
| COMPARATIVE EXAMPLE 9 | 2 | a | PRESENCE | 0.70-0.70 | 1.00 | 4.0 | BENT |
| COMPARATIVE EXAMPLE 10 | 2 | a | ABSENCE | 0.08-0.08 | 1.00 | 4.0 | BENT |

| | FINE BUBBLE | | DISSOLVED GAS | ULTRASONIC INTENSITY | | |
|---|---|---|---|---|---|---|
| | AVERAGE BUBBLE DIAMETER μm | BUBBLE NUMBER DENSITY PIECE/mL | AMOUNT RATIO TO SATURATED AMOUNT % | RELATIVE INTENSITY (AVERAGE) | STANDARD DEVIATION σ | CLEANING PERFORMANCE |
| EXAMPLE 1 | 15 | 75000 | 45 | 3.05 | 5.0 | AB |
| EXAMPLE 2 | 11 | 42500 | 25 | 3.45 | 5.3 | AB |
| EXAMPLE 3 | 70 | 8800 | 50 | 3.01 | 9.6 | B |
| EXAMPLE 4 | 30 | 6000 | 40 | 3.10 | 6.0 | AB |
| EXAMPLE 5 | 15 | 38000 | 35 | 3.13 | 3.5 | AB |
| EXAMPLE 6 | 13 | 100000 | 24 | 3.30 | 4.5 | AB |
| EXAMPLE 7 | 10 | 280000 | 25 | 3.61 | 5.1 | A |
| EXAMPLE 8 | 8 | 358000 | 35 | 3.55 | 5.6 | A |
| EXAMPLE 9 | 7 | 450000 | 42 | 3.45 | 7.0 | AB |
| EXAMPLE 10 | 15 | 9600 | 30 | 3.44 | 5.9 | B |
| EXAMPLE 11 | 28 | 8500 | 40 | 3.30 | 6.5 | B |
| EXAMPLE 12 | 45 | 5500 | 35 | 3.08 | 6.2 | B |
| EXAMPLE 13 | 56 | 4800 | 45 | 3.10 | 5.5 | B |
| EXAMPLE 14 | 50 | 6000 | 42 | 3.14 | 5.2 | B |
| EXAMPLE 15 | 5 | 189000 | 29 | 4.10 | 3.5 | A |
| EXAMPLE 16 | 4 | 450000 | 22 | 4.32 | 3.1 | A |
| EXAMPLE 17 | 2 | 3250000 | 15 | 4.55 | 1.9 | AA |
| EXAMPLE 18 | 3 | 1830000 | 19 | 4.41 | 2.5 | AA |
| COMPARATIVE EXAMPLE 1 | — | UNDETECTED | 100 | 1.00 | 22.6 | E |
| COMPARATIVE EXAMPLE 2 | 5100 | 150 | 70 | 1.05 | 25.0 | E |
| COMPARATIVE EXAMPLE 3 | 3200 | 200 | 50 | 1.13 | 21.0 | D |
| COMPARATIVE EXAMPLE 4 | 1300 | 280 | 65 | 1.30 | 20.2 | D |
| COMPARATIVE EXAMPLE 5 | 860 | 570 | 58 | 1.35 | 20.0 | C |
| COMPARATIVE EXAMPLE 6 | 3500 | 220 | 86 | 1.09 | 24.2 | E |
| COMPARATIVE EXAMPLE 7 | 3300 | 200 | 85 | 1.08 | 24.0 | E |
| COMPARATIVE EXAMPLE 8 | 230 | 880 | 55 | 1.39 | 20.0 | C |
| COMPARATIVE EXAMPLE 9 | — | UNDETECTED | 99 | 1.01 | 23.3 | E |
| COMPARATIVE EXAMPLE 10 | 700 | 100 | 90 | 1.05 | 21.1 | E |

The obtained results are collectively shown in the above Table 2.

Note that a description method regarding a column of "narrow portion opening cross-sectional area ratio" and a description method regarding a column of "opening cross-sectional area ratio" are the same as those of Table 1.

First, when referring to comparative examples, under the condition in which the circulation was simply performed (a comparative example 1), it was not possible to reduce the dissolved gas amount, and bubbles were never generated. For this reason, it can be confirmed that, although the intensity in the vicinity of a location where ultrasonic waves were oscillated was high, the ultrasonic waves did not propagate to the other locations, the standard deviation being an index of variation exceeded 20 with respect to the ultrasonic intensity of 33 mV, and thus the propagation of ultrasonic waves was nonuniform. Further, in comparative examples 2 and 3 in each of which there was no pressure reduction-release cycle, and the flow path was simply narrowed, it was possible to reduce the dissolved gas amount, but the bubble diameter did not become a diameter of fine bubble. The relative ultrasonic intensity at this time was almost the same as that of the comparative example 1, and the water-washing performance was poor. In comparative examples 4 and 5 in each of which the pressure reduction-release cycles were provided, and the flow path was in a state of proceeding straight, the relative ultrasonic intensity was increased to 1.3 times, but the standard deviation of the ultrasonic intensity was large. In these comparative examples, the water-washing performance was also insufficient, and thus unevenness of cleaning occurred. Further, also in comparative examples 6 to 8 in each of which the narrow portion interval $L/D_0$ was less than 1.0, or greater than 5.0, the bubble diameter did not become a diameter of fine bubble, the standard deviation of the ultrasonic intensity was increased to cause insufficient water-washing performance, and the unevenness of cleaning occurred, in a similar manner to the above. In a comparative example 9 in which the narrow portion opening cross-sectional area ratio was less than 0.10, there existed almost no liquid capable of being circulated, and thus bubbles were not generated or the circulating pump ran idle, resulting in that the liquid feeding itself could not be performed. In a comparative example 10 in which the opening cross-sectional area ratio was greater than 0.50, bubbles were not generated almost at all. The relative ultrasonic intensity at this time was similar to that of the comparative example 1, and the water-washing performance was also poor.

On the other hand, in examples 1 to 6 in each of which two or more pressure reduction-release cycles were provided, there existed the narrow portions provided to prevent the opening flow path from proceeding straight, and the narrow portion interval fell in the predetermined range, in examples 7 to 9 in each of which the number of pressure reduction-release cycles was increased, and in examples 10 to 14 in each of which the shape of the narrow portions was changed, the average bubble diameter became 100 µm or less capable being regarded as a fine bubble. Further, the dissolved gas amount was also observed to be reduced, the ultrasonic intensity was increased to three times or more, and the standard deviation was also reduced, resulting in that the cleaning performance was good. Besides, in examples 15 to 18 each satisfying the relation of $R_N/R_1 \geq 1.10$ by narrowing the narrow portion in the pressure reduction-release cycle on the side close to the pump, the pressure difference between the pressure reduction and the release became large, and it was observed that the dissolved gas was reduced and fine bubbles were micronized up to several µm or less to increase the bubble number density.

Experimental Example 3

Figure 19A:
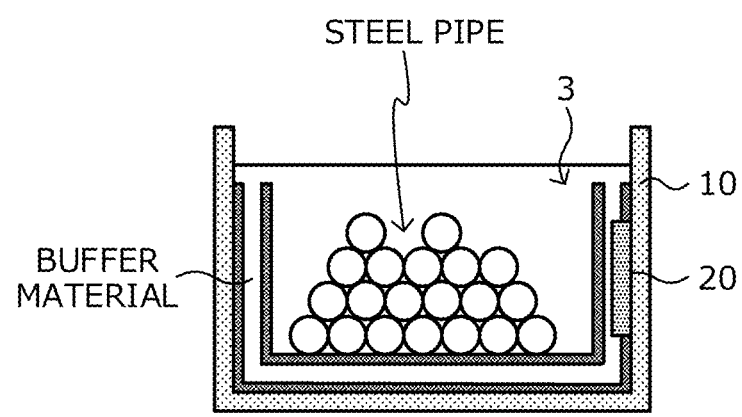
FIG. 19A is an explanatory diagram schematically illustrating a configuration of an ultrasonic treatment apparatus used in an experimental example 3.
Figure 19B:
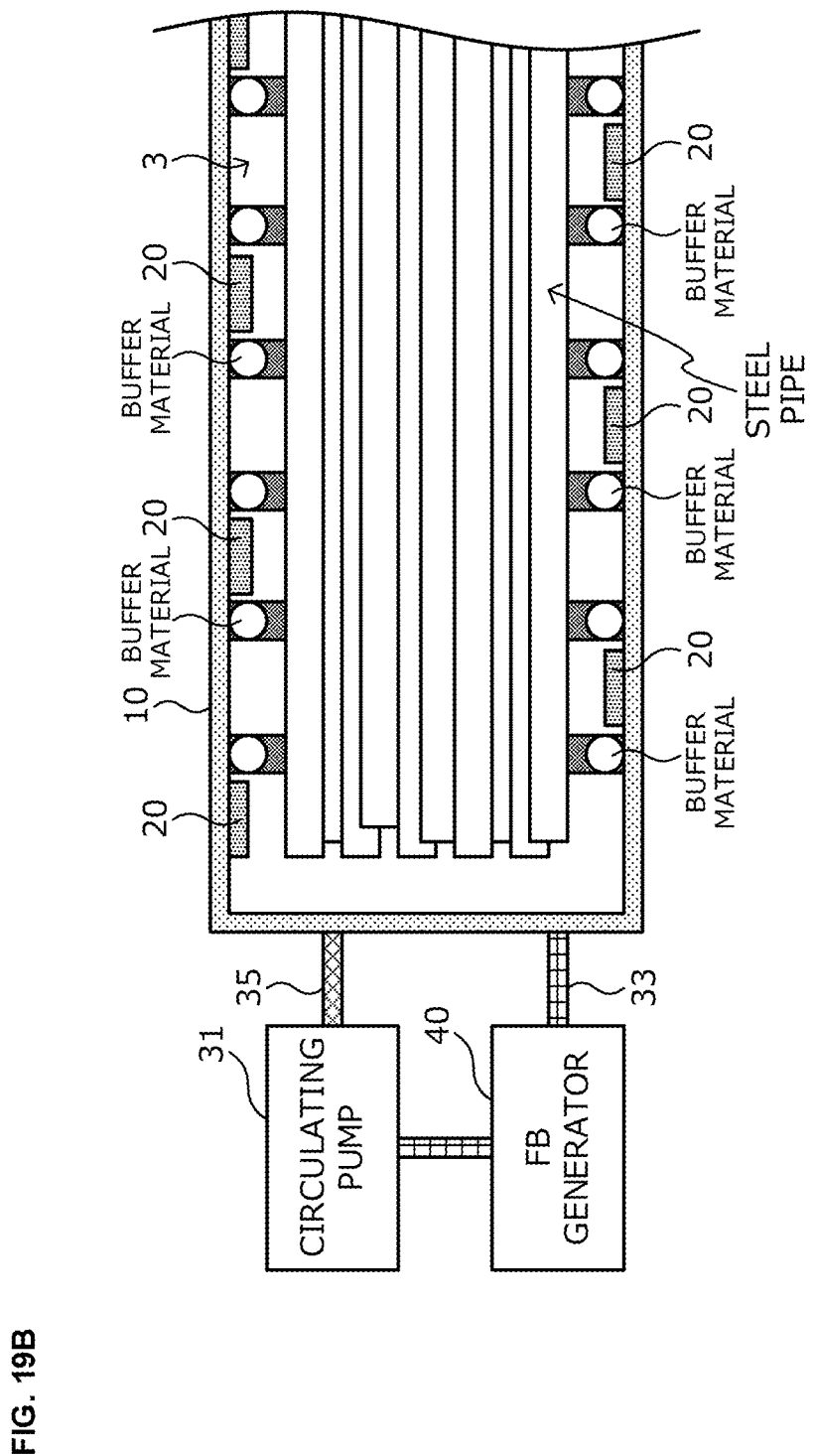
FIG. 19B is an explanatory diagram schematically illustrating a configuration of the ultrasonic treatment apparatus used in the experimental example 3.

FIG. 19A and FIG. 19B are explanatory diagrams schematically illustrating a state of executing a degreasing treatment of steel pipes by using the ultrasonic treatment apparatus according to the present invention. As the treatment tank 10, one having an outer wall made of steel, having a surface with PTFE lining, having a size of width of 1.0×length of 15.0×0.6 m, and having a capacity of 9 m³ was used. By using such a treatment tank 10, steel pipes having oil adhered to surfaces thereof were immersed for a predetermined period of time. As a degreasing solution being the treatment liquid 3, an alkali-based degreasing liquid was used. Between the steel pipes being objects to be cleaned and the treatment tank 10, buffer materials (more specifically, hollow buffer pipes made of SUS304) that function as curved members were provided at 1 m interval.

Further, to such a treatment tank 10, two systems of the circulation path 30 having the circulating pump 31, the treatment liquid extraction pipe 33, and the treatment liquid discharge pipe 35 were provided on a short side of the treatment tank 10, as partially illustrated in FIG. 19B. As the circulating pumps 31, two pumps of MEP-0505-2P manufactured by Seikow Chemical Engineering & Machinery, Ltd., being general-purpose pumps, were used. The pipe inside diameter $D_0$ of the treatment liquid extraction pipe 33 was set to 50 mm. Accordingly, a negative pressure environment in the treatment liquid extraction pipe 33 was in a range of −0.05 MPa to −0.10 MPa.

A plurality of movable projecting members were arranged so as to project in an opposing manner in the pipe, with the separation distances L of 40 mm, 100 mm, 200 mm, and 300 mm, in series with the treatment liquid extraction pipe 33, which was set to the fine bubble generator 40. Specifically, the fine bubble generator 40 is one having the structure with notation a illustrated in FIG. 16. Besides, a flowmeter was attached to the treatment liquid extraction pipe 33, to measure a flow rate of the treatment liquid extraction pipe 33, and the flow velocity of the treatment liquid 3 was controlled to fall within the above-described preferable range.

Further, as an ultrasonic oscillator of the ultrasonic generator 20, one having an output of 1200 W, and having a frequency sweep function was used, and as ultrasonic transducers, ten immersion transducers made of SUS were disposed to a wall surface in a longitudinal direction of the treatment tank 10. Further, a frequency of ultrasonic waves was set to 25 to 192 kHz.

An average bubble diameter of fine bubbles was specified by measuring a solution in the treatment tank 10 by using a precision particle size distribution measuring device Multisizer 4 manufactured by Beckman Coulter, Inc., and a nanoparticle analyzer NanoSight LM10 manufactured by Malvern. Further, for measurement of a dissolved gas amount, a dissolved oxygen meter LAQUA OM-51 manufactured by HORIBA, Ltd. was used to measure a dissolved oxygen amount (DO) every minute as a value in proportion to the dissolved gas amount, to thereby make an estimate of the dissolved gas amount with respect to a saturated dissolved amount (%). More specifically, the dissolved oxygen amount DO was measured every minute to calculate a difference ADO with respect to the dissolved oxygen amount at the last measurement. At a point of time when each value of ADO became less than 0.1 during continuous three minutes, the dissolved oxygen amount was judged to reach a lower limit, and a comparison of the dissolved gas amount and the average bubble diameter at the point of time was performed.

Figure 20:
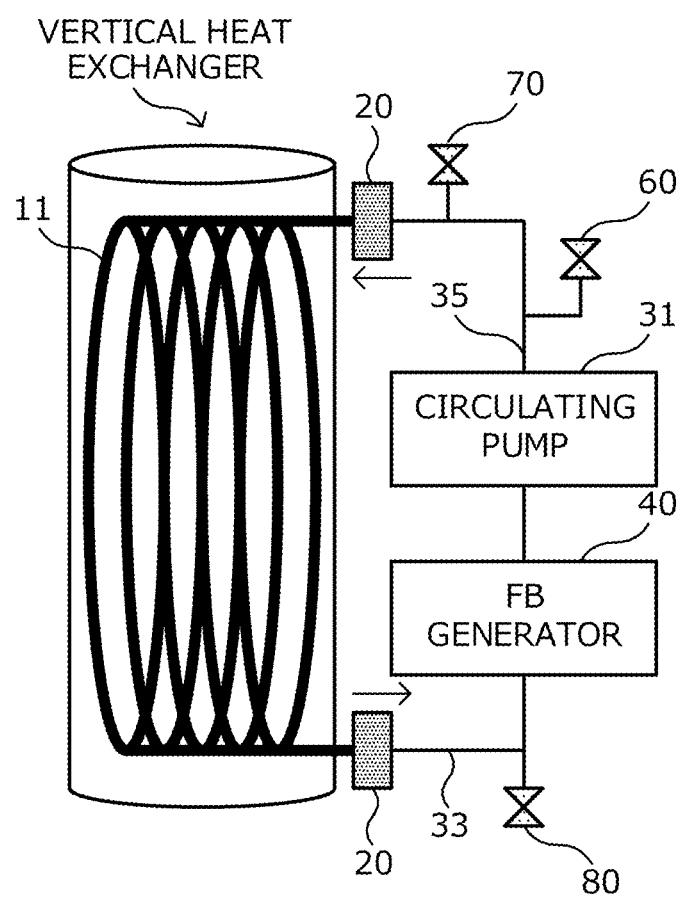
FIG. 20 is an explanatory diagram schematically illustrating a configuration of an ultrasonic treatment apparatus used in an experimental example 4.

Note that in the present experimental example, the buffer materials for preventing damages to the steel pipes were installed at a certain interval inside the treatment tank 10, as illustrated in FIG. 19A and FIG. 19B, and 20 steel pipes each having an inside diameter of 40 mm and a length of 10 m were immersed at a center part of the treatment tank 10, to thereby perform cleaning evaluations.

In the present experimental example, an oil removal ratio on the surface of the steel plate was measured, and the measured oil removal ratio was evaluated as a degreasing performance. More specifically, an oil removal amount was calculated from a mass change amount before and after the cleaning, and a ratio of the oil removal amount capable of being removed under respective cleaning conditions to the total amount of oil adhered to the surface of the steel plate was set to the oil removal ratio. Note that evaluation criteria for the degreasing performance in Table 3 below are as follows.

Oil removal ratio
AA: 100% or less to 95% or more
A: less than 95% to 90% or more
AB: less than 90% to 85% or more
B: less than 85% to 80% or more
C: less than 80% to 60% or more
D: less than 60% to 40% or more
E: less than 40%

Specifically, the evaluations "AA" and "A" mean that the degreasing performance was very good, the evaluations "AB" and "B" mean that the degreasing performance was good, the evaluation "C" means that the degreasing performance had a little problem, and evaluations "D" and "E" mean that the degreasing performance was poor.

TABLE 3

| | FINE BUBBLE GENERATOR | | | | | |
|---|---|---|---|---|---|---|
| | | NARROW PORTION OPENING CROSS-SECTIONAL AREA RATIO $R_i = (A_i/A_0)$ | OPENING CROSS-SECTIONAL AREA RATIO $R_N/R_1$ | NARROW PORTION INTERVAL $L/D_0$ | FINE BUBBLE | |
| | NUMBER OF NARROW PORTION | | | | AVERAGE BUBBLE DIAMETER μm | BUBBLE NUMBER DENSITY PIECE/mL |
| EXAMPLE 1 | 2 | 0.40-0.20 | 2.00 | 4.0 | 9 | 253000 |
| EXAMPLE 2 | 2 | 0.40-0.10 | 4.00 | 4.0 | 8 | 188000 |
| EXAMPLE 3 | 2 | 0.50-0.30 | 1.67 | 4.0 | 10 | 135000 |
| EXAMPLE 4 | 3 | 0.50-0.40-0.30 | 1.67 | 4.0 | 4 | 570000 |
| EXAMPLE 5 | 3 | 0.40-0.40-0.20 | 2.00 | 4.0 | 3 | 453000 |
| EXAMPLE 6 | 2 | 0.40-0.40 | 1.00 | 4.0 | 11 | 120000 |
| EXAMPLE 7 | 2 | 0.40-0.50 | 0.80 | 4.0 | 50 | 8800 |
| EXAMPLE 8 | 2 | 0.40-0.40 | 1.00 | 2.0 | 10 | 180000 |
| EXAMPLE 9 | 2 | 0.40-0.40 | 1.00 | 4.0 | 11 | 120000 |
| EXAMPLE 10 | 2 | 0.40-0.40 | 1.00 | 4.0 | 11 | 120000 |
| EXAMPLE 11 | 2 | 0.40-0.40 | 1.00 | 4.0 | 11 | 120000 |
| EXAMPLE 12 | 2 | 0.50-0.50 | 1.00 | 4.0 | 50 | 8800 |
| EXAMPLE 13 | 2 | 0.50-0.50 | 1.00 | 4.0 | 50 | 8800 |
| EXAMPLE 14 | 2 | 0.40-0.40 | 1.00 | 4.0 | 11 | 120000 |
| EXAMPLE 15 | 2 | 0.40-0.40 | 1.00 | 4.0 | 11 | 120000 |
| COMPARATIVE EXAMPLE 1 | — | 1.00 | — | 4.0 | — | UNDETECTED |
| COMPARATIVE EXAMPLE 2 | 1 | 0.50 | — | 4.0 | 5100 | 1500 |
| COMPARATIVE EXAMPLE 3 | 1 | 0.50 | — | 4.0 | 5100 | 1500 |
| COMPARATIVE EXAMPLE 4 | 2 | 0.50-0.50 | 1.00 | 0.8 | 3200 | 600 |
| COMPARATIVE EXAMPLE 5 | 2 | 0.50-0.50 | 1.00 | 6.0 | 200 | 830 |
| COMPARATIVE EXAMPLE 6 | 2 | 0.70-0.70 | 1.00 | 4.0 | 340 | 900 |
| COMPARATIVE EXAMPLE 7 | 2 | 0.09-0.08 | 1.10 | 4.0 | 560 | 350 |

| | FINE BUBBLE PROPORTION OF BUBBLE HAVING RESONANT DIAMETER OR LESS % | DISSOLVED GAS AMOUNT RATIO TO SATURATED AMOUNT % | ULTRASONIC WAVE | | CLEANING PERFORMANCE |
|---|---|---|---|---|---|
| | | | FREQUENCY kHz | SWEEP kHz | |
| EXAMPLE 1 | 99 | 25 | 35 | — | A |
| EXAMPLE 2 | 99 | 22 | 35 | — | A |
| EXAMPLE 3 | 99 | 32 | 35 | — | A |
| EXAMPLE 4 | 99 | 19 | 35 | — | AA |
| EXAMPLE 5 | 99 | 16 | 35 | — | AA |
| EXAMPLE 6 | 95 | 35 | 35 | — | AB |
| EXAMPLE 7 | 90 | 45 | 35 | — | B |
| EXAMPLE 8 | 97 | 30 | 35 | — | AB |
| EXAMPLE 9 | 95 | 33 | 25 | — | AB |
| EXAMPLE 10 | 81 | 33 | 100 | — | B |
| EXAMPLE 11 | 76 | 33 | 192 | — | B |
| EXAMPLE 12 | 90 | 45 | 35 | 0.1 | A |
| EXAMPLE 13 | 90 | 45 | 35 | 2.0 | A |
| EXAMPLE 14 | 81 | 33 | 100 | 0.1 | A |
| EXAMPLE 15 | 81 | 33 | 100 | 10.0 | A |
| COMPARATIVE EXAMPLE 1 | — | 100 | 35 | — | F |
| COMPARATIVE EXAMPLE 2 | 10 | 70 | 35 | — | E |
| COMPARATIVE EXAMPLE 3 | 3 | 70 | 100 | — | F |
| COMPARATIVE EXAMPLE 4 | 10 | 90 | 35 | — | E |

TABLE 3-continued

| | | | | | |
|---|---|---|---|---|---|
| COMPARATIVE EXAMPLE 5 | 30 | 65 | 35 | — | C |
| COMPARATIVE EXAMPLE 6 | 22 | 88 | 35 | — | D |
| COMPARATIVE EXAMPLE 7 | 15 | 94 | 35 | — | F |

The obtained results are collectively shown in the above Table 3.

Note that a description method regarding a column of "narrow portion opening cross-sectional area ratio" and a description method regarding a column of "opening cross-sectional area ratio" are the same as those of Table 1.

First, when referring to comparative examples, in comparative examples 1 to 3 each of which did not have two or more of the pressure reduction-release cycles according to the present invention, in a comparative example 4 in which the narrow portion interval $L/D_0$ was less than 1.0, and in a comparative example 5 in which the narrow portion interval $L/D_0$ was greater than 5.0, fine bubbles were not generated, and the number of bubbles having a resonant diameter or less was small. In a comparative example 6 in which the opening cross-sectional area ratio was greater than 0.5, and in a comparative example 7 in which the opening cross-sectional area ratio was less than 0.1, fine bubbles were not generated almost at all, and the number of bubbles having a resonant diameter or less with respect to the ultrasonic frequency was small. Further, the dissolved gas amount was not reduced as well, and as a result of this, the degreasing performance was poor, or a region where the cleaning was insufficiently performed was generated.

On the other hand, in examples 1 to 15 in each of which two or more of the pressure reduction-release cycles were provided, and the narrow portion opening cross-sectional area ratio was within 0.5, the cleaning performance was good, and in the examples 1 to 5, in particular, in each of which the narrow portion interval satisfied $1.0 \leq L/D \leq 5.0$, the cleaning performance was better. Further, in the examples 12 to 15 in each of which the sweep of frequency of ultrasonic waves was conducted, it was possible to perform the cleaning more effectively.

Experimental Example 4

Attention was focused on a vertical heat exchanger whose outer wall was made of SS (rolled steel for general structure) and in which a pipe with an inside diameter of 45 mm, a length of 3.0 m, and a thickness of 9 mm was continuously connected, and the pipe of the vertical heat exchanger was set to an object to be treated. In the present experimental example, water was filled in the pipe, and then deposits adhered to an inner surface of the pipe were circulated for a predetermined period of time. Specifically, in the present experimental example, the pipe itself being the object to be treated functions as a treatment part.

FIG. 20 is an explanatory diagram schematically illustrating a state of executing a cleaning treatment of a pipe provided to a heat exchanger, by using the ultrasonic treatment apparatus according to the present invention. As schematically illustrated in FIG. 20, the treatment liquid extraction pipe 33 was connected to one end portion of a pipe 11 provided inside the heat exchanger, and the treatment liquid extraction pipe 33 was connected to the circulating pimp 31. The used circulating pump 31 is MEP-0505-2P manufactured by Seikow Chemical Engineering & Machinery, Ltd., being a general-purpose pump. Accordingly, a negative pressure environment in the treatment liquid extraction pipe 33 was in a range of −0.05 MPa to −0.10 MPa. Further, two movable projecting members were arranged so as to project in an opposing manner in the pipe, in series with the treatment liquid extraction pipe 33, which was set to the fine bubble generator 40. Specifically, the fine bubble generator 40 is one having the structure with notation a illustrated in FIG. 16. Further, the treatment liquid discharge pipe 35 was provided on a positive pressure side of the circulating pump 31, and connected to the other end portion of the pipe 11. Note that in the fine bubble generator 40, the separation distances L were set to 40 mm, 100 mm, 200 mm, and 300 mm.

Further, as illustrated in FIG. 20, an air vent valve 60 and a water supply valve 70 were provided to the treatment liquid discharge pipe 35, to thereby make the inside of the pipe 11, the treatment liquid extraction pipe 33, the fine bubble generator 40, and the treatment liquid discharge pipe 35 to be filled with water (more specifically, fresh water) as the treatment liquid 3. Besides, a drainage valve 80 was provided to the treatment liquid extraction pipe 33 to make it possible to collect a part of the treatment liquid 3 flowing through the circulation path 30 as illustrated in FIG. 20. Note that a flowmeter was attached to the treatment liquid extraction pipe 33, to measure a flow rate of the treatment liquid extraction pipe 33, and the flow velocity of the treatment liquid 3 was controlled to fall within the above-described preferable range.

Further, an ultrasonic oscillator of the ultrasonic generator 20 is one having a frequency of 30 kHz and an output of 600 W, and one clamp-type ultrasonic transducer made of SUS was installed at a connection portion between the pipe 11 and the treatment liquid extraction pipe 33, and at a connection portion between the pipe 11 and the treatment liquid discharge pipe 35, respectively, as schematically illustrated in FIG. 20.

An average bubble diameter of fine bubbles was specified by measuring a solution collected by the drainage valve 80, by using a precision particle size distribution measuring device Multisizer 4 manufactured by Beckman Coulter, Inc., and a nanoparticle analyzer NanoSight LM10 manufactured by Malvern. Further, for measurement of a dissolved gas amount, a dissolved oxygen meter LAQUA OM-51 manufactured by HORIBA, Ltd. was used to measure a dissolved oxygen amount (DO) every minute as a value in proportion to the dissolved gas amount, to thereby make an estimate of the dissolved gas amount with respect to a saturated dissolved amount (%). More specifically, the dissolved oxygen amount DO was measured every minute to calculate a difference ADO with respect to the dissolved oxygen amount at the last measurement. At a point of time when each value of ADO became less than 0.1 during continuous three minutes, the dissolved oxygen amount was judged to reach a lower limit, and a comparison of the dissolved gas amount and the average bubble diameter at the point of time was performed.

In the present experimental example, cleanliness in the pipe was measured and evaluated as a cleaning performance. More specifically, 1 L of the treatment liquid after one minute of the performance of cleaning was collected from the drainage valve 80, turbidity was measured by using a turbidimeter manufactured by OPTEX Company, Limited, and the turbidity was set to the cleanliness of the treatment liquid 3. Note that evaluation criteria for the cleaning performance in Table 4 below are as follows.

Cleanliness (turbidity)
A: 3000 or less to 1500 or more
B: less than 1500 to 800 or more
C: less than 800 to 500 or more
D: less than 500 to 300 or more
E: less than 300 to 100 or more
F: less than 100 to 1 or more Specifically, the evaluations "A" and "B" mean that the turbidity was increased since it was possible to collect the deposits, and thus the cleaning performance was very good, the evaluation "C" means that the cleaning performance was good, the evaluation "D" means that the cleaning performance had a little problem, and evaluations "E" and "F" mean that the cleaning performance was poor.

cross-sectional area ratio was greater than 0.5, and in a comparative example 6 in which the opening cross-sectional area ratio was less than 0.1, fine bubbles were not generated almost at all. Besides, the dissolved gas amount was not reduced as well, and as a result of this, the cleaning performance was poor.

On the other hand, in examples 1 to 6 in each of which the pressure reduction-release cycle was provided at two locations or more, and the opening cross-sectional area ratio was within 0.5, the cleaning performance was good, and in the examples 1 to 4, in particular, in each of which the narrow portion interval satisfied $1.0 \leq L/D_0 \leq 5.0$, the cleaning performance was better.

Preferred embodiments of the present invention have been described above in detail with reference to the attached drawings, but the present invention is not limited to the embodiments. It should be understood that various changes and modifications are readily apparent to those skilled in the art who has the common general knowledge in the technical field to which the present invention pertains, within the scope of the technical spirit as set forth in claims, and they should also be covered by the technical scope of the present invention.

TABLE 4

| | | FINE BUBBLE GENERATOR | | | FINE BUBBLE | | DISSOLVED GAS | |
|---|---|---|---|---|---|---|---|---|
| | NUMBER OF NARROW PORTION | NARROW PORTION OPENING CROSS-SECTIONAL AREA RATIO $R_i = (A_i/A_0)$ | OPENING CROSS-SECTIONAL AREA RATIO $R_N/R_1$ | NARROW PORTION INTERVAL $L/D_0$ | AVERAGE BUBBLE DIAMETER μm | BUBBLE NUMBER DENSITY PIECE/mL | AMOUNT RATIO TO SATURATED AMOUNT % | CLEANING PERFORMANCE |
| EXAMPLE 1 | 2 | 0.50-0.30 | 1.67 | 4.4 | 11 | 240000 | 46 | A |
| EXAMPLE 2 | 2 | 0.40-0.20 | 2.00 | 4.4 | 8 | 890000 | 26 | A |
| EXAMPLE 3 | 2 | 0.40-0.10 | 4.00 | 4.4 | 5 | 1200000 | 20 | A |
| EXAMPLE 4 | 2 | 0.30-0.30 | 1.00 | 4.4 | 23 | 110000 | 43 | B |
| EXAMPLE 5 | 2 | 0.30-0.30 | 1.00 | 2.2 | 12 | 45000 | 35 | B |
| EXAMPLE 6 | 2 | 0.40-0.50 | 0.80 | 4.4 | 50 | 9600 | 58 | C |
| COMPARATIVE EXAMPLE 1 | — | 1.00 | — | 4.4 | — | UNDETECTED | 100 | E |
| COMPARATIVE EXAMPLE 2 | 1 | 0.50 | — | 4.4 | 5100 | 1500 | 75 | E |
| COMPARATIVE EXAMPLE 3 | 2 | 0.50-0.50 | 1.00 | 0.7 | 3200 | 520 | 90 | F |
| COMPARATIVE EXAMPLE 4 | 2 | 0.50-0.50 | 1.00 | 6.7 | 230 | 900 | 67 | D |
| COMPARATIVE EXAMPLE 5 | 2 | 0.60-0.60 | 1.00 | 4.4 | 340 | 500 | 90 | D |
| COMPARATIVE EXAMPLE 6 | 2 | 0.08-0.08 | 1.00 | 4.4 | 950 | 450 | 93 | F |

The obtained results are collectively shown in the above Table 4.

Note that a description method regarding a column of "narrow portion opening cross-sectional area ratio" and a description method regarding a column of "opening cross-sectional area ratio" are the same as those of Table 1.

First, when referring to comparative examples, in comparative examples 1 and 2 each of which did not have two or more of the pressure reduction-release cycles according to the present invention, in a comparative example 3 in which the narrow portion interval $L/D_0$ was less than 1, and in a comparative example 4 in which the narrow portion interval $L/D_0$ was greater than 5, fine bubbles were not generated almost at all, resulting in that the cleaning performance was poor. In a comparative example 5 in which the opening

EXPLANATION OF CODES

1 ultrasonic treatment apparatus
3 treatment liquid
10 treatment tank
20 ultrasonic generator
30 circulation path
31 circulating pump
33 treatment liquid extraction pipe
35 treatment liquid discharge pipe
40 fine bubble generator
41 narrow portion
43 non-narrow portion
45 pressure reduction-release cycle
50 curved member

What is claimed is:

1. An ultrasonic treatment apparatus, comprising:
a treatment part capable of accommodating a treatment liquid and an object to be treated;
an ultrasonic generator that is provided in the treatment part and applies ultrasonic waves to the object to be treated; and
a circulation path for circulating the treatment liquid in the treatment part, wherein:
the circulation path has a circulating pump for circulating the treatment liquid, a treatment liquid extraction pipe that connects a treatment liquid extracted from the treatment part to the circulating pump, and a treatment liquid discharge pipe that discharges a treatment liquid passed through the circulating pump to the treatment part; and
a fine bubble generator which performs deaeration on the extracted treatment liquid and generates fine bubbles in the treatment liquid, is provided to the circulation path, in series with the treatment liquid extraction pipe, wherein
the fine bubble generator has two or more narrow portions each having an opening flow path of the treatment liquid with a size narrower than an inside diameter of the treatment liquid extraction pipe, in which the opening flow paths of the narrow portions adjacent to each other are configured to prevent the treatment liquid from proceeding straight, wherein:
regarding each of the narrow portions, when an opening cross-sectional area of the inside diameter of the treatment liquid extraction pipe is set to $A_O$, and an opening cross-sectional area of the inside diameter of the treatment liquid extraction pipe at an i (i is an integer of 1 or more)-th narrow portion from the treatment part side toward the circulating pump side is represented as $A_i$, an opening cross-sectional area ratio $R_i$ of the i-th narrow portion represented as $A_i/A_O$ satisfies the following formula (1); and
when an interval between the i-th narrow portion and an i+1-th narrow portion is represented as $L_i$, the following formula (2) is satisfied, and
when the number of the narrow portions is set to N, and an N-th opening area ratio from the treatment part side toward the circulating pump side is represented as $R_N$, the following formula (3) and formula (4) are satisfied, $$R_i = 0.10 \text{ to } 0.50 \quad \text{Formula (1)}$$

$$1.0 \leq L_i/2(A_O/\pi)^{0.5} \leq 5.0 \quad \text{Formula (2)}$$

$$R_{i+1} \geq R_i \quad \text{Formula (3)}$$

$$R_N/R_1 \geq 1.10 \quad \text{Formula (4)}.$$

2. The ultrasonic treatment apparatus according to claim 1, wherein
when the treatment liquid extraction pipe is seen from a pipe axis direction, positions of the opening flow paths of the narrow portions adjacent to each other are not overlapped with each other.

3. The ultrasonic treatment apparatus according to claim 1, wherein:
a treatment tank which contains the treatment liquid is provided as the treatment part; and
the ultrasonic generator indirectly applies ultrasonic waves to the object to be treated via the treatment liquid.

4. The ultrasonic treatment apparatus according to claim 1, wherein
the ultrasonic generator directly applies ultrasonic waves to the object to be treated that is immersed in the treatment liquid in the treatment part.

5. The ultrasonic treatment apparatus according to claim 1, wherein
the number N of the narrow portions is 2 to 10.

6. The ultrasonic treatment apparatus according to claim 1, comprising one or a plurality of the narrow portions each formed by a projecting member projecting from an inner surface of the treatment liquid extraction pipe.

7. The ultrasonic treatment apparatus according to claim 6, comprising, as the narrow portion, a movable projecting member projecting from the inner surface of the treatment liquid extraction pipe.

8. The ultrasonic treatment apparatus according to claim 1, comprising one or a plurality of the narrow portions each formed by an opening member provided with one or a plurality of through holes.

9. The ultrasonic treatment apparatus according to claim 1, wherein
the ultrasonic generator can select a frequency of the ultrasonic waves from a frequency band of 20 kHz to 200 kHz.

10. The ultrasonic treatment apparatus according to claim 1, wherein
the ultrasonic generator can apply ultrasonic waves to the treatment liquid while performing a sweep within a range of ±0.1 kHz to ±10 kHz centered on a selected frequency of the ultrasonic waves.

11. A fine bubble supply method, comprising supplying, when performing a predetermined treatment on an object to be treated while applying ultrasonic waves to a treatment part capable of accommodating a treatment liquid and the object to be treated, the treatment liquid containing fine bubbles to the treatment part, wherein
an ultrasonic generator that is provided in the treatment part and applies ultrasonic waves to the object to be treated, and a circulation path for circulating the treatment liquid in the treatment part are provided with respect to the treatment part, wherein:
the circulation path has a circulating pump for circulating the treatment liquid, a treatment liquid extraction pipe that connects a treatment liquid extracted from the treatment part to the circulating pump, and a treatment liquid discharge pipe that discharges a treatment liquid passed through the circulating pump to the treatment part; and
a fine bubble generator which performs deaeration on the extracted treatment liquid and generates fine bubbles in the treatment liquid, is provided to the circulation path, in series with the treatment liquid extraction pipe, wherein
the fine bubble generator has two or more narrow portions each having an opening flow path of the treatment liquid with a size narrower than an inside diameter of the treatment liquid extraction pipe, in which the opening flow paths of the narrow portions adjacent to each other are configured to prevent the treatment liquid from proceeding straight, wherein:
regarding each of the narrow portions, when an opening cross-sectional area of the inside diameter of the treatment liquid extraction pipe is set to $A_O$, and an opening cross-sectional area of the inside diameter of the treatment liquid extraction pipe at an i (i is an integer of 1 or more)-th narrow portion from the treatment part side toward the circulating pump side is represented as $A_i$, an opening cross-sectional area ratio $R_i$ of the i-th narrow portion represented as $A_i/A_0$ satisfies the following formula (1); and when an interval between the i-th narrow portion and an i+1-th narrow portion is represented as $L_i$, the following formula (2) is satisfied, and when the number of the narrow portions is set to N, and an N-th opening area ratio from the treatment part side toward the circulating pump side is represented as $R_N$, the following formula (3) and formula (4) are satisfied, $R_i = 0.10$ to $0.50$  Formula (1)

$1.0 \leq L_i/2(A_0/\pi)^{0.5} \leq 5.0$  Formula (2)

$R_{i+1} \geq R_i$  Formula (3)

$R_N/R_1 \geq 1.10$  Formula (4).

12. The fine bubble supply method according to claim 11, wherein
the fine bubble generator generates the fine bubbles to make a dissolved gas amount to be 50% or less of a saturated dissolved gas amount in the treatment liquid to be discharged to the treatment part.

13. The fine bubble supply method according to claim 11, wherein
the fine bubble generator generates the fine bubbles to make the fine bubbles having an average bubble diameter of 1 μm to 100 μm exist at a bubble number density in a range of $1\times10^3$ pieces/mL to $1\times10^{10}$ pieces/mL in the treatment liquid to be discharged to the treatment part.

14. The fine bubble supply method according to claim 11, wherein
the ultrasonic generator selects a frequency of the ultrasonic waves from a frequency band of 20 kHz to 200 kHz.

15. The fine bubble supply method according to claim 11, wherein
the ultrasonic generator applies ultrasonic waves to the treatment liquid while performing a sweep within a range of ±0.1 kHz to ±10 kHz centered on a selected frequency of the ultrasonic waves.

* * * * *